(12) United States Patent
Beck et al.

(10) Patent No.: US 10,352,403 B2
(45) Date of Patent: Jul. 16, 2019

(54) MULTISTEP AUTOMATIC TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Josef Haupt, Tettnang (DE); Martin Brehmer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 770 days.

(21) Appl. No.: 14/972,257

(22) Filed: Dec. 17, 2015

(65) Prior Publication Data

US 2016/0178034 A1 Jun. 23, 2016

(30) Foreign Application Priority Data

Dec. 17, 2014 (DE) .................... 10 2014 226 232

(51) Int. Cl.
 *F16H 3/66* (2006.01)

(52) U.S. Cl.
 CPC ............... *F16H 3/66* (2013.01); *F16H 3/666* (2013.01); *F16H 2200/0069* (2013.01); *F16H 2200/0073* (2013.01); *F16H 2200/2012* (2013.01); *F16H 2200/2046* (2013.01); *F16H 2200/2048* (2013.01); *F16H 2200/2064* (2013.01);
 (Continued)

(58) Field of Classification Search
 CPC .... F16H 3/66; F16H 3/666; F16H 2200/2097; F16H 2200/2064; F16H 2200/2048; F16H 2200/2046; F16H 2200/2094; F16H 2200/0073; F16H 2200/0069; F16H 2200/2012
 See application file for complete search history.

(56) References Cited

U.S. PATENT DOCUMENTS 7,789,792 B2 9/2010 Kamm et al.
8,858,387 B2 10/2014 Haupt et al.
8,876,652 B2 11/2014 Mellet et al.
(Continued)

FOREIGN PATENT DOCUMENTS

DE 102005002337 A1 2/2006
DE 202007017648 U1 4/2008
(Continued)

OTHER PUBLICATIONS

German Search Report for DE 10 2014 226 232.1, dated Jul. 16, 2015, 7 pages

*Primary Examiner* — David J Hlavka
(74) *Attorney, Agent, or Firm* — Dority & Manning, P.A.

(57) ABSTRACT

An automatic transmission includes a housing, a plurality of rotatable shafts, a plurality of planetary gear sets and a plurality of shift elements. A second element of a fourth planetary gear set forms a drive shaft, and a second element of a third planetary gear set forms an output shaft. A first element of the fourth planetary gear set forms a third shaft, and a fifth shaft is constantly connected to at least two shift elements of the plurality of shift elements. A third element of the third planetary gear set forms a sixth shaft, and a seventh shaft constantly connects a first element of a second planetary gear set to a third element of the fourth planetary gear set. A second element of the second planetary gear set forms an eighth shaft.

39 Claims, 32 Drawing Sheets

(52) U.S. Cl.
CPC ............... *F16H 2200/2094* (2013.01); *F16H 2200/2097* (2013.01)

(56) References Cited

U.S. PATENT DOCUMENTS

| | | | |
|---|---|---|---|
| 9,803,723 B2* | 10/2017 | Haupt | ..................... F16H 3/66 |
| 9,869,372 B2* | 1/2018 | Goleski | .................... F16H 3/66 |
| 9,945,428 B2* | 4/2018 | Goleski | ............... F16D 25/0638 |
| 2002/0119859 A1* | 8/2002 | Raghavan | ................. F16H 3/66 |
| | | | 475/317 |
| 2016/0363195 A1* | 12/2016 | Cho | ......................... F16H 3/66 |
| 2017/0002901 A1* | 1/2017 | Kook | ....................... F16H 3/66 |

FOREIGN PATENT DOCUMENTS

| | | |
|---|---|---|
| DE | 102009001253 B3 | 6/2010 |
| DE | 102009047271 A1 | 6/2011 |
| DE | 102014103115 A1 | 9/2014 |

* cited by examiner

| Gang (gear) | geschlossene Schaltelemente (engaged shifting elements) | | | | | |
|---|---|---|---|---|---|---|
| | Bremse (brake) | | Kupplung (clutch) | | | |
| | A | B | C | D | E | F |
| 1 | X | X | X | | | X |
| 2 | X | X | X | | X | |
| 3 | X | X | | | X | X |
| 4 | | X | X | | X | X |
| 5 | | X | | X | X | X |
| 6 | | X | X | X | X | |
| 7 | | X | X | X | | X |
| 8 | X | | X | X | X | X |
| 9 | X | | | X | X | X |
| 10 | X | | | X | | X |
| R | X | X | | X | | X |

Fig. 5

| Planetenradsatztyp - Kombinationen (planetary gear set type combinations) | | | | |
|---|---|---|---|---|
| RS1 | RS4 | RS2 | RS3 | |
| Minus | Minus | Minus | Minus | |
| Plus | Minus | Minus | Minus | |
| Minus | Plus | Minus | Minus | |
| Minus | Minus | Plus | Minus | |
| Plus | Plus | Minus | Minus | |
| Plus | Minus | Plus | Minus | |
| Minus | Plus | Plus | Minus | |
| Plus | Plus | Plus | Minus | |

Fig. 6

| Gang (gear) | geschlossene Schaltelemente (engaged shifting elements) | | | | | | |
|---|---|---|---|---|---|---|---|
| | Bremse (brake) | | Kupplung (clutch) | | | | |
| | A | B | C | D | E | F | G |
| 1 | X | X |   |   |   | X | X |
| 2 | X | X | X |   |   | X |   |
| 3 | X | X | X |   | X |   |   |
| 4 | X | X |   |   | X | X |   |
| 5 | X | X | X |   | X |   |   |
| 6 |   | X | X | X | X |   |   |
| 7 |   | X | X | X | X |   |   |
| 8 | X | X | X | X |   |   |   |
| 9 | X |   | X | X | X | X |   |
| 10 | X |   |   | X | X | X |   |
| 11 | X |   |   | X |   | X |   |
| R | X | X |   | X |   | X |   |

Fig. 23

| Planetenradsatztyp - Kombinationen (planetary gear set type combinations) | | | |
|---|---|---|---|
| RS1 | RS4 | RS2 | RS3 |
| Minus | Minus | Minus | Minus |
| Plus | Minus | Minus | Minus |
| Minus | Minus | Plus | Minus |
| Plus | Minus | Plus | Minus |

Fig. 24

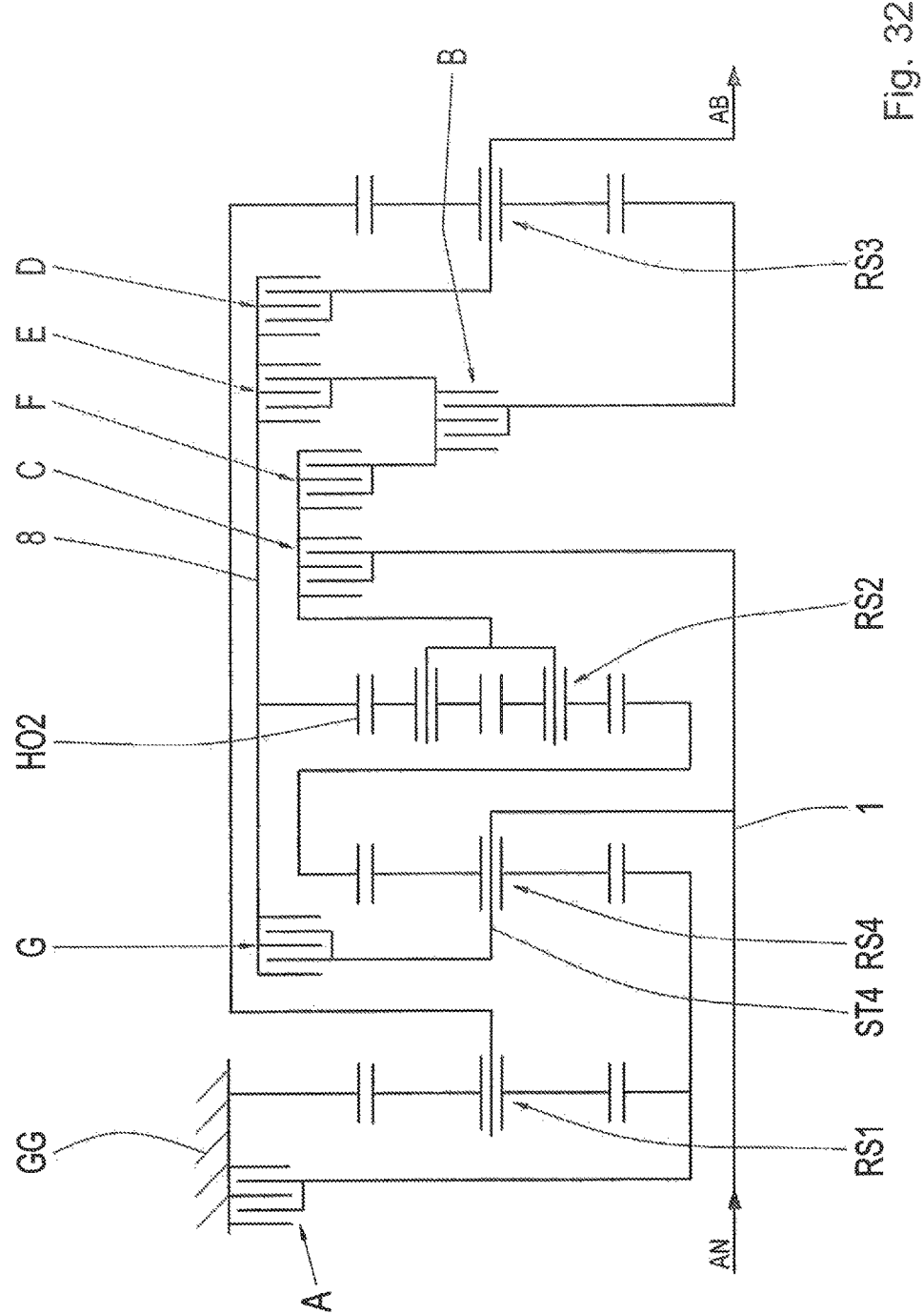

MULTISTEP AUTOMATIC TRANSMISSION

FIELD OF INVENTION

The present invention relates generally to multi-speed automatic transmissions.

BACKGROUND

Generally, automatically shiftable vehicle transmissions of planetary design are already described in the state of the art many times over, and are subject to continuous development and improvement. Such transmissions should feature a sufficient number of forward gears and one reverse gear and a transmission ratio that is very well-suited for motor vehicles with a high overall spread, favorable progressive steps and a sufficiently large start-up transmission ratio for the specific application. In addition, this transmission should require low construction costs, in particular a low number of shift elements and, upon a sequential shifting operation, should avoid so-called "group gearshifts," such that, when there are gearshifts to the next higher or next lower gear, only one previously engaged shift element is open, and one previously open shift element is engaged.

Such a multi-speed automatic transmission is described, for example, in DE 10 2005 002 337 A1 of the applicant. It essentially includes one drive shaft and one output shaft, a total of eight rotatable shafts, a total of four individual planetary gear sets and five shift elements. Through the selective engaging of three of five shift elements designed as clutches and brakes, a total of eight forward gears can be shifted without any group gearshifts.

Alternative 8-speed automatic transmissions are described in DE 10 2009 047 271 A1 of the applicant, each of which comprises four individual planetary gear sets, five shift elements and a total of nine shafts. In a first variant, a transmission is proposed, in which, in contrast to DE 10 2005 002 337 A1, the ring gear of the first planetary gear arranged close to the drive, the sun gear of which is constantly connected to the sun gear of the second planetary gear set connected to the drive shaft and can be fixed through the first shift element at the transmission housing, is firmly connected to the transmission housing. Thereby, the second shift element is arranged in the power flow between the planetary gear carrier of such first planetary gear set and the ring gear of the fourth planetary gear set connected to the output shaft. In a second variant, a transmission is proposed, in which, in contrast to DE 10 2005 002 337 A1, the ring gear of the first planetary gear arranged close to the drive is firmly connected to the transmission housing, whereas the second shift element is arranged in the power flow between the sun gear of such first planetary gear set and sun gear, which can be fixed on the transmission housing through the first shift element, of the second planetary gear set connected to the drive shaft.

A further development of the 8-gear automatic transmission described in DE 10 2009 001 253 B3 of the applicant. Here, through the addition of a sixth shift element formed as a clutch in the power flow between the drive shaft and the second planetary gear set that can be blocked through the engaging of the fifth of the previously present five shift elements, an additional forward gear can be presented, which, from its transmission ratio, is larger than the previous first gear of the 8-gear transmission, thus an additional start-up gear below the previous first gear of the 8-gear transmission.

SUMMARY OF THE INVENTION

The present invention is directed to a multi-speed transmission that includes four planetary gear sets, which features at least ten forward gears that can be shifted without any group gearshifts. Additional objectives and advantages of the invention set will be set forth in part in the following description, or may be obvious from the description, or may be learned through practice of the invention.

Accordingly, an exemplary automatic transmission is proposed, which features a housing, a total of at least nine rotatable shafts including one drive shaft and including one output shaft, four individual planetary gear sets and several shift elements, the selective meshing of the different transmission ratio relationships of which between the drive shaft and output shaft leads to the shifting of several forward gears and (at least) one reverse gear. Each of the four planetary gear sets features three different elements, thus one sun gear, one planetary gear carrier and one ring gear.

The second element of the fourth planetary gear set forms the drive shaft designed as a first shaft. The second element of the third planetary gear set forms the output shaft designed as a second shaft. The first element of the fourth planetary gear set forms the third shaft. The fifth shaft is constantly connected to at least two of the shift elements. The third element of the third planetary gear set forms the sixth shaft. The first element of the second planetary gear set and the third element of the fourth planetary gear set are constantly connected to each other and form (in the manner of a clutch shaft) the seventh shaft. The second element of the second planetary gear set forms the eighth shaft. The third element of the second planetary gear set forms the ninth shaft.

A first shift element is arranged in the power flow between the third shaft and the housing, such that the third shaft can be fixed. A second shift element is constantly connected to the fourth shaft. A third shift element is arranged in the power flow between the first shaft (drive shaft) and the ninth shaft. A fourth shift element is arranged in the power flow between the secondary shaft (output shaft) and the eighth shaft. A fifth shift element is arranged in the power flow between the fifth shaft and the eighth shaft. A sixth shift element is arranged in the power flow between the fifth shaft and the ninth shaft.

If the third and sixth shift elements are simultaneously engaged, the fifth shaft thus rotates with the rotational speed of the drive shaft. In addition, both the second and the third planetary gear sets can be blocked through the locking of shift elements. In the blocked state of a planetary gear set, all three elements of this planetary gear set rotate with the same rotational speed. The second planetary gear is then blocked if the fifth and sixth shift elements are simultaneously engaged.

Thereby, with the formulation of "constantly connected" in connection with the coupling of a shift element to a planetary gear set, it must be understood that the input or output element of the respective shift element is connected to one of the elements of the respective planetary gear set through a torque-proof or torsionally flexible connection, such that there is always a fixed rotational speed relationship between this planetary gear set and the input or output element of this shift element.

In connection with the coupling of a shift element to a shaft, with the formulation of "constantly connected," it must be understood that the input or output element of the respective shift element is directly connected to the respective shaft through a torque-proof or torsionally flexible connection, such that there is always a fixed rotational speed relationship between this shaft and the input or output element of this shift element.

In connection with the coupling of a planetary gear set to another planetary gear set, with the formulation of "constantly connected," it must be understood that one of the elements of the respective planetary gear set is directly connected to one of the elements of the respective other planetary gear set through a torque-proof or torsionally flexible connection, such that there is always a fixed rotational speed relationship between these two planetary gear set elements.

In connection with the coupling of an element of a planetary gear set or a shift element on the housing, with the formulation of "constantly connected," it must be understood that the respective element of the planetary gear set or the output element of the respective shift element, as the case may be, is directly connected to the housing through a torque-proof or torsionally flexible connection, such that the respective element of the planetary gear set or the output element of each shift element is always fixed relative to the housing or at a standstill.

Thereby, compared to the state of the art, the automatic transmission in accordance with exemplary aspects of the invention features fully independent kinematics. With the use of six shift elements, ten forward gears can be shifted without any group gearshifts. Likewise, a reverse gear can be shifted.

If, starting from this automatic transmission with six shift elements, an additional seventh shift element is provided, such seventh shift element is arranged in the power flow between the first shaft and the eighth shaft. In this case, eleven forward gears can be shifted with a total of seven shift elements, without any group gearshifts. Likewise, one reverse gear can be shifted.

In an exemplary first arrangement of the invention, it is proposed that the first element of the first planetary gear set is constantly connected to the third shaft, that the third element of the first planetary gear set forms the fourth shaft of the automatic transmission and can be fixed to the housing through the second shift element, that the first element of the third planetary gear set is constantly connected to the fifth shaft, and that the second element of the first planetary gear set is constantly connected to the sixth shaft.

Here, the second shift element is arranged in the power flow between the fourth shaft and the housing, such that the third element of the first planetary gear set can be fixed to the housing through the second shift element. If the fourth and fifth shift elements are simultaneously engaged, all three elements of the third planetary gear set rotate with the same rotational speed. In addition, such automatic transmission features three clutch shafts, through which the four planetary gear sets are constantly connected to each other, namely the third shaft for the constant coupling of the first element of the first planetary gear set with the first element of the fourth planetary gear set, the sixth shaft for the constant coupling of the second element of the first planetary gear set with the third element of the third planetary gear set along with the seventh shaft for the constant coupling of the first element of the second planetary gear set with the third element of the fourth planetary gear set.

In an exemplary second arrangement of the invention, it is proposed that the third element of the first planetary gear set is constantly connected to the housing, that the first element of the first planetary gear set forms the fourth shaft of the automatic transmission and is connectable to the third shaft through the second shift element, that the first element of the third planetary gear set is constantly connected to the fifth shaft, and that the second element of the first planetary gear set is constantly connected to the sixth shaft.

Here, the second shift element is arranged in the power flow between the third shaft and the fourth shaft, such that the first element of the first planetary gear set is connectable to the first element of the fourth planetary gear set through the second shift element. Since the fourth shaft can be fixed to the housing through the first shift element, the third shaft or the first element of the first planetary gear set can be fixed to the housing through the simultaneously locking of the first and second shift element. If the fourth and fifth shift elements are simultaneously engaged, all three elements of the third planetary gear set rotate with the same rotational speed. In addition, such automatic transmission features two clutch shafts, through which the four planetary gear sets are constantly connected to each other, namely the sixth shaft for the constant coupling of the second element of the first planetary gear set with the third element of the third planetary gear set, along with the seventh shaft for the constant coupling of the first element of the second planetary gear set with the third element of the fourth planetary gear set.

In an exemplary third arrangement of the invention, it is proposed that the third element of the first planetary gear set is constantly connected to the housing, that the first element of the first planetary gear set is constantly connected to the third shaft, that the second element of the first planetary gear set forms the fourth shaft of the automatic transmission and is connectable to the sixth shaft through the second shift element, and that the first element of the third planetary gear set is constantly connected to the fifth shaft.

Here, the second shift element is arranged in the power flow between the fourth shaft and the sixth shaft, such that the second element of the first planetary gear set is connectable to the third element of the third planetary gear set through the second shift element. If the fourth and fifth shift elements are simultaneously engaged, all three elements of the third planetary gear set rotate with the same rotational speed. In addition, such automatic transmission features two clutch shafts, through which the four planetary gear sets are constantly connected to each other, namely, the third shaft for the constant coupling of the first element of the first planetary gear set with the first element of the fourth planetary gear set, along with the seventh shaft for the constant coupling of the first element of the second planetary gear set with the third element of the fourth planetary gear set.

In an exemplary fourth arrangement of the invention, it is proposed that the third element of the first planetary gear set is constantly connected to the housing, that the first element of the first planetary gear set is constantly connected to the third shaft, that the first element of the third planetary gear set forms the fourth shaft of the automatic transmission and is connectable to the fifth shaft through the second shift element, and that the second element of the first planetary gear set is constantly connected to the sixth shaft. The fifth shaft is not directly connected to any of the elements of the planetary gear set.

Here, the second shift element is arranged in the power flow between the fourth shaft and the fifth shaft, such that the first element of the third planetary gear set is connectable to the fifth shaft, which on its part is not directly connected to any of the elements of the planetary gear set. If the second, fourth and fifth shift elements are simultaneously engaged, all three elements of the third planetary gear set rotate with the same rotational speed. In addition, such automatic transmission features three clutch shafts, through which the four planetary gear sets are constantly connected to each other, namely the third shaft for the constant coupling of the first element of the first planetary gear set with the first element of the fourth planetary gear set, the sixth shaft for the constant coupling of the second element of the first planetary gear set with the third element of the third planetary gear set, and the seventh shaft for the constant coupling of the first element of the second planetary gear set with the third element of the fourth planetary gear set.

Preferably, with the automatic transmission in accordance with exemplary aspects of the invention, four of the shift elements are engaged in any gear. If six shift elements are provided, in each gear, preferably only two of the shift elements are not engaged. If seven shift elements are provided, in each gear, preferably only three of the shift elements are not engaged. Upon a change from one gear to the subsequent higher or lower gear, only one of the previously engaged shift elements is open and one previously open shift elements is engaged, such that, upon each sequential upshift and downshift by one gear, so-called "group gearshifts" are avoided.

In order to present ten forward gears and one reverse gear with six shift elements, such a transmission may feature the following shifting logic or gear logic: in the first forward gear, the first, second, third and sixth shift elements are engaged or transfer torque. In the second forward gear, the first, second, third and fifth shift elements are engaged or transfer torque. In the third forward gear, the first, second, fifth and sixth shift elements are engaged or transfer torque. In the fourth forward gear, the second, third, fifth, and sixth shift elements are engaged or transfer torque. In the fifth forward gear, the second, fourth, fifth and sixth shift elements are engaged or transfer torque. In the sixth forward gear, the second, third, fourth and fifth shift elements are engaged or transfer torque. In the seventh forward gear, the second, third, fourth, and sixth shift elements are engaged or transfer torque. In the eighth forward gear, the third, fourth, fifth and sixth shift elements are engaged or transfer torque. In the ninth forward gear, the first, third, fourth, and sixth shift elements are engaged or transfer torque. In the tenth forward gear, the first, fourth, fifth and sixth shift elements are engaged or transfer torque. In the reverse gear, the first, second, fourth and sixth shift elements are engaged or transfer torque.

If there is an additional seventh shift element in the power flow between the first shaft and eighth shaft, in contrast to the design of the transmission with only six shift elements, an additional forward gear can be realized under the first gear of the design of the transmission with only six shift elements, thus an additional forward gear with a transmission ratio greater than that of the transmission ratio of the first gear of the design of the transmission with only six shift elements. Thus, this additional forward gear is particularly well-suited as a so-called "crawler," with a smaller overall transmission ratio for a large pulling force. As shifting logic or gear logic, it can be provided that, in such an additional forward gear, the first, second, sixth and seventh shift elements are engaged or transfer torque, while, in all other forward gears and in the reverse gear, the seventh shift element is engaged or transfers torque.

In an advantageous manner, it is possible that the additional seventh shift element is to be accommodated in the same installation space, or in an installation space that is slightly necessary for the transmission in accordance with exemplary aspects of the invention with only six shift elements.

In an advantageous manner, the kinematics in accordance with exemplary aspects of the invention of an automatic transmission with the direct connection of the fourth, fifth and sixth shift elements allows that the third and sixth shift elements are to be arranged, viewed spatially, directly adjacent to each other, the fifth and sixth shift element are to be arranged, viewed spatially, directly adjacent to each other and the fourth and fifth shift elements are to be arranged, viewed spatially, directly adjacent to each other. In an advantageous manner in terms of production technology, this allows the use of a common multi-disk carrier for such shift elements.

All four planetary gear sets may be designed as so-called "negative planetary gear sets," the respective planetary sets of which mesh with the sun gear and the ring gear of the respective planetary gear set.

As an exemplary alternative to the design of the gear set system with four individual negative planetary gear sets, an individual negative planetary gear set may be replaced by a so-called "positive planetary gear set," which enables an alternative spatial arrangement of the individual shift elements inside the transmission housing. As is well-known, a positive planetary gear set features a planetary gear carrier ("bar") with inner and outer planetary gears rotatably mounted on it, whereas each of the inner planetary gears meshes with each outer planetary gear and with the sun gear of the positive planetary gear set, while each of the outer planetary gears meshes with each inner planetary gear and with the ring gear of the positive planetary gear set. As an alternative to the design of the gear set system with four individual negative planetary gear sets, several of the negative planetary gear sets may also be replaced by positive planetary gear sets.

To ensure the same kinematics of the claimed gear set system, it is provided that the first element of each negative planetary gear set and the first element of each positive planetary gear set is formed as a sun gear, that the second element of each negative planetary gear set is formed as a planetary gear carrier, while the second element of each positive planetary gear set is formed as a ring gear, and that the third element of each negative planetary gear set is formed as a ring gear, while the third element of each positive planetary gear set is formed as a planetary gear carrier.

With respect to the spatial arrangement of the four planetary gear sets in the housing of the automatic transmission, in one exemplary embodiment it is proposed to arrange all four planetary gear sets coaxially next to each other in the defined order of "first, fourth, second, third planetary gear set," by which it is possible to, in a simple manner and with minimum leakage, supply all clutches with the means of pressure necessary for hydraulic actuation. For an application with a drive shaft and an output shaft that pass or are positioned coaxially to each other, in this case, the first planetary gear set may be the planetary gear set of the planetary gear set group turned towards the input of the automatic transmission.

In conjunction with the order of planetary gear sets of "first, fourth, second, third planetary gear set," as an advantageous exemplary spatial arrangement of the shift elements, it is proposed to arrange the first shift element, viewed spatially, on that side of the first planetary gear set that is turned away from the fourth planetary gear set;

depending on the kinematic connection of the second shift element at the other transmission components, to arrange the second shift element at least partially in an area radially above the first planetary gear set, or alternatively axially adjacent to the first planetary gear set at the side of the first planetary gear set turned away from the fourth planetary gear set, or alternatively in an area axially between the first and fourth planetary gear sets, or alternatively axially adjacent to the third planetary gear set in an area axially between the second and third planetary gear sets, or alternatively at least partially in an area radially above the third planetary gear set, or alternatively in an area axially between the second and third planetary gear sets, or alternatively in an area radially below the fifth and/or sixth shift elements, or alternatively axially adjacent to the third planetary gear set, or alternatively designed as a claw coupling at least partly in an area centrally within the first element of the first planetary gear set, or alternatively designed as a claw coupling at least partly in an area centrally within the first element of the third planetary gear set;

to arrange the third shift element axially adjacent to the second planetary gear set in an area axially between the second and third planetary gear sets;

to arrange the fourth shift element axially adjacent to the third planetary gear set in an area axially between the second and third planetary gear sets, or alternatively in an area axially between the second and fourth planetary gear sets, preferably axially adjacent to the second planetary gear set;

to arrange the fifth shift element in an area axially between the second and fourth planetary gear sets;

to arrange the sixth shift element in an area axially between the second and fourth planetary gear sets;

if present, to arrange the seventh shift element in an area axially between the first and fourth planetary gear sets, or alternatively in an area radially above the fourth planetary gear sets, or alternatively in an area axially between the fourth and second planetary gear sets.

Of course, other spatial arrangements of the four planetary gear sets and the six or seven shift elements, as the case may be, in the housing of the automatic transmission are possible. For example, the four planetary gear sets can be arranged coaxially next to each other in the defined order of "second, fourth, first, third planetary gear set," whereas, in this case, for use in a vehicle with a so-called "standard-drive," it is expedient to allocate the second planetary gear set to the drive side of the automatic transmission, while, for a use in a vehicle with a so-called "front-transverse drive," it is expedient to allocate the third planetary gear set to the drive side of the automatic transmission.

In practice, all proposed designs and arrangements for an automatic transmission in accordance with aspects of the invention feature, in particular for passenger cars, useful transmission ratios with very large overall spreads in terms of the gear gradation that is reasonable for drivability, which has positive effects on the intended low consumption of fuel. In addition, the automatic transmission in accordance with aspects of the invention is characterized by, measured by the number of gears, a low number of shift elements and comparatively low construction costs. Furthermore, with the automatic transmission in accordance with aspects of the invention, a good degree of efficiency arises in all gears; on the one hand, this is a consequence of low drag losses, since four of the shift elements mesh in each gear; on the other hand, this is also the consequence of low gearing losses in the simply structured individual planetary gear sets.

In an advantageous manner, with the automatic transmission in accordance with aspects of the invention, it is possible to realize a start-up of the vehicle both with a start-up element external to the transmission and with a frictional shift element internal to the transmission. In a manner known per se, a start-up element external to the transmission may be formed as a hydrodynamic converter, as a so-called "dry start-up clutch," as a so-called "wet start-up clutch," as a magnetic powder clutch or as a centrifugal clutch. As an alternative to the arrangement of such a start-up element in the power flow between drive motor and the transmission, the start-up element external to the transmission may also be arranged in the power flow behind the transmission, whereas, in this case, the drive shaft of the transmission is constantly connected to the crank shaft of the drive motor in a torsion-proof or torsionally flexible manner. The first and second shift element, in particular the second shift element transferring torque in the multiple forward gears and in the reverse gear, is suitable, for example, as the start-up element internal to the transmission.

In addition, the automatic transmission in accordance with aspects of the invention is designed to enable adaptability to the various drive train arrangements both in the direction of the power flow and in spatial terms. Thus, with the same transmission diagram, depending on the stationary transmission ratio of the individual planetary gears, various gear jumps arise, such that an application-specific or vehicle-specific variation is made possible. Furthermore, without any special structural measures, it is possible to arrange the input and the output of the transmission either coaxially to each other or axially parallel to each other. An axle differential and/or a distributor differential may be arranged on the input side or on the output side of the transmission. It is also possible to provide additional freewheels at each suitable point of the multi-speed transmission, in particular by forming, if applicable, a connection between one shaft and the housing or by two shafts. Moreover, a wear-free brake such as a hydraulic or electric retarder or the like may be arranged at each shaft, preferably at the drive shaft or at the output shaft; this is of particular importance for use in commercial vehicles. Moreover, a power take-off may be provided for the drive of additional power units at each shaft, preferably at the drive shaft or the output shaft. An additional advantage of the automatic transmission in accordance with aspects of the invention is that an electric motor can be installed at each shaft as a generator and/or as an additional drive motor.

The shift elements that are used may be formed as power-shifting clutches or brakes. In particular, force-fitting clutches or brakes—such as multi-disk clutches, band brakes and/or cone clutches—may be used. Moreover, positive-locking brakes and/or clutches—such as synchronizations or claw couplings—may be used as shift elements.

BRIEF DESCRIPTION OF THE DRAWINGS

In the following, the invention is more specifically described on the basis of the sample drawings. Thereby, the same or comparable components are provided with the same reference signs. The following is shown:

FIG. 5 provides an exemplary shifting diagram for the exemplary transmission in accordance with FIG. 1 through FIG. 4;

FIG. 6 provides a table with variants of the exemplary transmission in accordance with FIG. 1 through FIG. 4;

FIG. 23 provides an exemplary shifting diagram for the exemplary transmission in accordance with FIG. 19 through FIG. 23;

FIG. 24 provides a table with exemplary variants of the exemplary transmission in accordance with FIG. 19 through FIG. 23;

FIG. 32 provides a schematic presentation of a second exemplary alternative to the exemplary transmission in accordance with FIG. 22.

DETAILED DESCRIPTION

Figure 1:
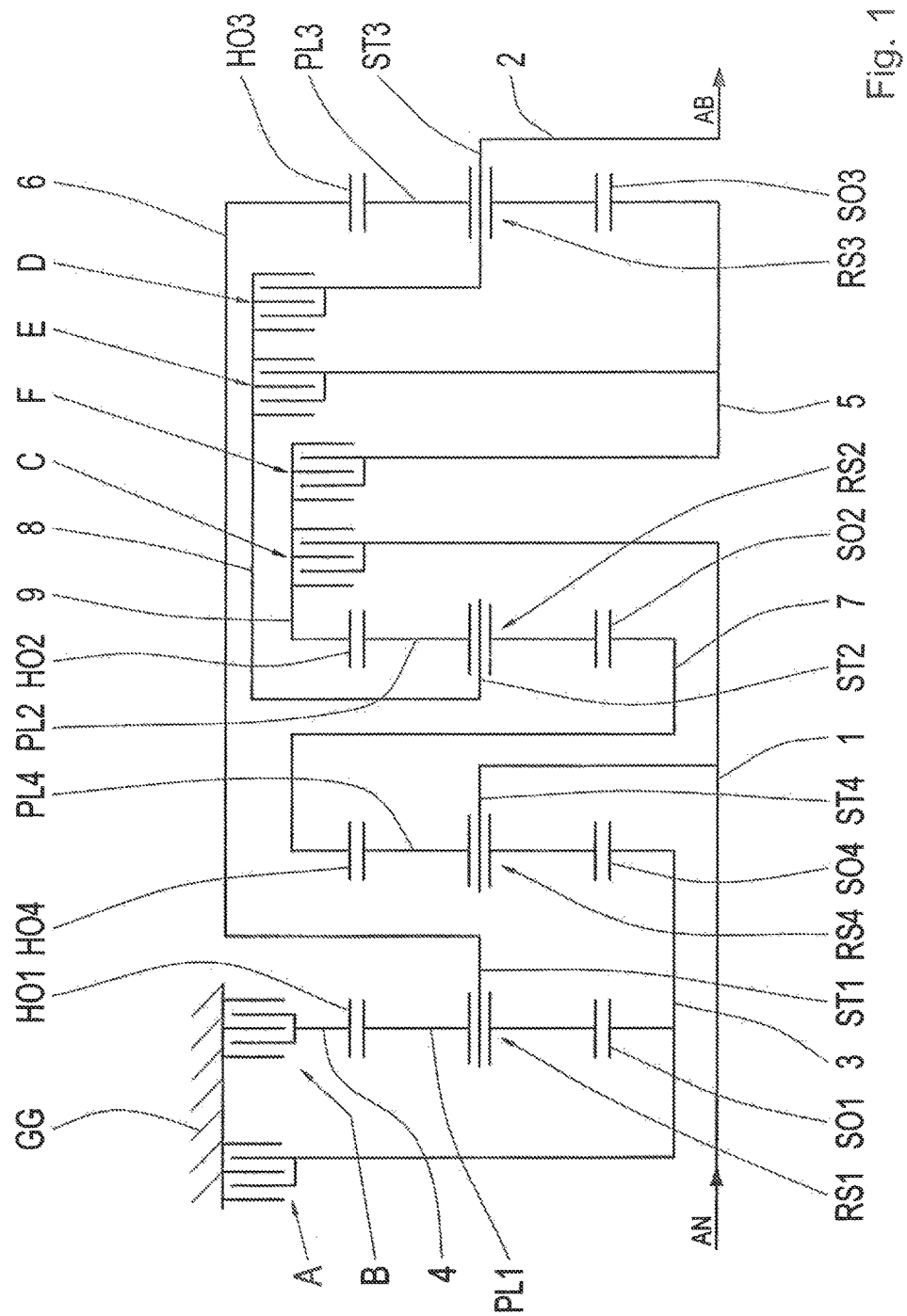
FIG. 1 provides a schematic presentation of a first exemplary embodiment of a 10-speed automatic transmission in accordance with aspects of the invention.

Reference will now be made to embodiments of the invention, one of more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows the gear set diagram of a first exemplary embodiment of a 10-speed automatic transmission in accordance with aspects of the invention. The transmission comprises, inclusively, one drive shaft AN and, inclusively, an output shaft AB, nine rotatable shafts 1 to 9, four planetary gear sets RS1, RS2, RS3, RS4 and six shift elements A, B, C, D, E, F, which are all arranged in a housing GG of the transmission. All four planetary gear sets RS1, RS2, RS3, RS4 are formed as simple negative planetary gear sets, each of which comprises a first, a second and a third element. As is well-known, a negative planetary gear features planetary gears that mesh with the sun gear and ring gear of the planetary set. Each of the third elements of the four planetary gear sets RS1, RS2, RS3, RS4 is formed as a ring gear and is designated with HO1, HO2, HO3 and HO4. Each of the first elements of the four planetary gear sets RS1, RS2, RS3, RS4 is formed as a sun gear and is designated with SO1, SO2, SO3, SO4. Each of the second elements of the four planetary gear sets RS1, RS2, RS3, RS4 is formed as a planetary gear carrier and is designated with ST1, ST2, ST3 and ST4. The planetary gears rotatably mounted on the planetary gear carriers ST1, ST2, ST3 and ST4 are designated with PL1, PL2, PL3 and PL4.

The shift elements A and B are formed as brakes, which in the exemplary embodiment shown are designed as frictional-locking, shiftable multi-disk brakes, and may also be designed in another arrangement as frictional-locking, shiftable band brakes or, for example, as positive-locking, shiftable claw brakes or cone brakes. The additional shift elements C, D, E and F are formed as clutches, which in the exemplary embodiment shown are all designed as a frictional-locking, shiftable multi-disk clutch, and may also be designed in another arrangement, for example, as a positive-locking, shiftable claw coupling or cone clutch. With this total of six shift elements A to F, a selective shifting of ten forward gears and one reverse gear can be realized, which will be described in more detail below on the basis of FIG. 5.

With respect to the coupling of the individual elements of the four planetary gear sets RS1, RS2, RS3 RS4 to each other, and to the drive shaft and output shaft AN, AB, with the exemplary embodiment in accordance with FIG. 1, the following is provided: the planetary gear carrier ST4 of the fourth planetary gear set RS4 and the drive shaft AN are connected to each other in a torsion-proof or torsionally flexible manner and form the first shaft of the automatic transmission, designated with 1. The planetary gear carrier ST3 of the third planetary gear set RS3 and the output shaft AB are connected to each other in a torque-proof or torsionally flexible manner and form the second shaft of the automatic transmission, designated with 2. The sun gear SO1 of the first planetary gear set RS1 and the sun gear SO4 of the fourth planetary gear set RS4 are constantly connected—in the manner of a first clutch shaft—to each other in a torque-proof or torsionally flexible manner. Here, together with the sun gear SO1 of the first planetary gear set RS1, the sun gear SO4 of the fourth planetary gear set RS4 forms the third shaft of the automatic transmission, designated with 3. The ring gear HO1 of the first planetary gear set RS1 forms the fourth shaft of the automatic transmission, designated with 4. The sun gear SO3 of the third planetary gear set RS3 forms the fifth shaft of the automatic transmission, designated with 5. The planetary gear carrier ST1 of the first planetary gear set RS1 and the ring gear HO3 of the third planetary gear set RS3 are constantly connected—in the manner of a second clutch shaft—to each other in a torque-proof or torsionally flexible manner. Here, together with the planetary gear carrier ST1 of the first planetary gear set, the ring gear HO3 of the third planetary gear set RS3 forms the sixth shaft of the automatic transmission, designated with 6. The ring gear HO4 of the fourth planetary gear set RS4 and the sun gear SO2 of the second planetary gear set RS2 are constantly connected to each other in a torque-proof or torsionally flexible manner and form—in the manner of a third clutch shaft—the seventh shaft of the automatic transmission, designated with 7. The planetary gear carrier ST2 of the second planetary gear set RS2 forms the eighth shaft of the automatic transmission, designated with 8. The ring gear HO2 of the second planetary gear set RS2 forms the ninth shaft of the automatic transmission, designated with 9.

With respect to the coupling of the seven shift elements A to G to the described nine shafts 1 through 9 of the transmission and to the transmission housing GG, with the exemplary automatic transmission in accordance with aspects of the invention shown in FIG. 1, the following is provided: the first shift element A is arranged in the power flow between the third shaft 3 and the transmission GG. The second shift element B is arranged in the power flow between the fourth shaft 4 and the transmission GG. The third shift element C is arranged in the power flow between the first shaft 1 and the ninth shaft 9. The fourth shift element D is arranged in the power flow between the second shaft 2 and the eighth shaft 8. The fifth shift element E is arranged in the power flow between the fifth shaft 5 and the eighth shaft 8. The sixth shift element F is arranged in the power flow between the fifth shaft 5 and the ninth shaft 9.

Thus, the first shaft 1 is constantly connected to one shift element (clutch C), the second shaft 2 is constantly connected to one shift element (clutches D), the third shaft 3 is constantly connected to one shift element (brake A), the fourth shaft 4 is constantly connected to one shift element (brake B), the fifth shaft 5 is constantly connected to two shift elements (clutches E, F), the sixth shaft 6 is not connected to any of the shift elements, the sixth shaft 7 is not connected to any of the shift elements, the eighth shaft 8 is constantly connected to two shift elements (clutches D, E), the ninth shaft 9 is constantly connected to two shift elements (clutches C, F).

Thus, the first planetary gear set RS1 is constantly connected to two shift elements (brakes A, B), the second planetary gear set RS2 is constantly connected to four shift elements (clutches C, D, E, F), the third planetary gear set RS3 is constantly connected to three shift elements (clutches D, E, F), and the fourth planetary gear set RS4 is constantly connected to two shift elements (brake A, clutch C).

Through the simultaneously engaging of the clutches E and F (viewed in the direction of the power flow, arranged in a row one behind the other), the second planetary gear set RS2 can be blocked. Here, in the blocked state, the planetary carrier ST2 and the ring gear HO2 are then connected to each other, with the consequence that the sun gear SO2, the planetary gear carrier ST2 and the ring gear HO2 then rotate with the same rotational speed. Through the simultaneously locking of the clutches D and E (viewed in the direction of the power flow, arranged in a row one behind the other), the third planetary gear set RS3 can be blocked. Here, in the blocked state, the planetary gear carrier ST3 and the sun gear SO3 are then connected to each other, with the consequence that the sun gear SO3, the planetary gear carrier ST3 and the ring gear HO3 then rotate at the same rotational speed. Through the simultaneously locking of the clutches D and E (viewed in the direction of the power flow, arranged in a row one behind the other), the first shaft 1 5 connectable to the fifth shaft, such that the sun gear SO3 of the third planetary gear set RS3 (together the ring gear HO2 of the second planetary gear set RS2) then rotates with the rotational speed of the drive shaft AN.

In the exemplary embodiment shown in FIG. 1, the four planetary gear sets RS1, RS2, RS3, RS4 are arranged, viewed in an axial direction, coaxially one behind the other in the defined order of "RS1, RS4, RS2, RS3," whereas the drive shaft AN and the output shaft AB are arranged coaxially to each other, and the first planetary gear set RS1 forms the gear set of the automatic transmission close to the drive and the third planetary gear set RS3 forms the gear set of the transmission close to the output. In an advantageous manner, such arrangement of "RS1, RS4, RS2, RS3" may allow each of the four planetary gear sets RS1, RS2, RS3, RS4 to be reached through centrically in an axial direction only by a maximum of one shaft of the automatic transmission.

In principle, the spatial arrangement of the shift elements within the transmission is arbitrary, and is limited only by the dimensions and the external shaping of the transmission housing GG. Accordingly, the arrangement of components shown in FIG. 1 is expressly understood to be just one of many variants of the arrangement of the components. The specialist can find numerous suggestions for this in, for example, the aforementioned document DE 10 2005 002 337 A1. Based on the transmission structure, the exemplary embodiment shown in FIG. 1 is particularly well-suited for installation in a motor vehicle with a so-called "standard drive." The arrangement of components shown in FIG. 1 is based on the automatic transmission disclosed in FIG. 4 of DE 10 2005 002 337 A1.

As shown in FIG. 1, the two planetary gear sets RS1 and RS4 are directly adjacent to each other. In the exemplary embodiment shown, the brake A is arranged, viewed spatially, axially next to the first planetary gear set RS1 (arranged on the input side of the transmission housing), on the side of the planetary gear set RS1 that is opposite or turned away from the planetary gear set RS4. The brake A is arranged on a relatively large diameter, on a diameter larger than the diameter of the ring gear HO1. In a simple manner, the brake A may be supplied with means of pressure and coolant by the transmission housing GG. In a structurally simple manner, the brake A may be integrated into a housing wall of the transmission GG close to the drive.

As is also shown in FIG. 1, at least the multi-disk pack of the brake B is arranged, viewed spatially, in an area radially around the first planetary gear set RS1. In a simple manner, the brake B may be supplied with means of pressure and lubricant by the transmission housing GG. In a structurally simple manner, the brake B may be integrated into the transmission GG or in a housing wall of the transmission GG close to the drive.

As is also shown in FIG. 1, all of the four clutches C, D, E and F are arranged, viewed spatially, in an area between the third planetary gear set RS3 (arranged on the output side of the transmission housing) and the second planetary gear set RS2 (turned towards the third planetary gear set RS3).

The two clutches C and F are arranged axially next to each other (for example), whereas the clutch C axially and directly borders the second planetary gear set RS2. In an advantageous manner in terms of production technology, a common multi-disk carrier is provided for these two clutches C and F; it forms a section of the ninth shaft 9. In the presented exemplary embodiment, the multi-disk packs of the clutches C and F are arranged axially next to each other on the same diameter; in one variant, however, the multi-disk pack of the clutch F is arranged, viewed in an axial direction, radially over the multi-disk pack of the clutch C.

In addition, the two clutches D and E are arranged axially next to each other (for example), whereas the clutch D axially and directly borders the third planetary RS3. In an advantageous manner in terms of production technology, for such two clutches D and E, a common multi-disk carrier is provided; it forms one section of the eighth shaft 8. In the presented exemplary embodiment, the multi-disk packs of the clutches E and F are arranged axially next to each other; in one variant, viewed in an axial direction, the multi-disk pack of the clutch D is also arranged over the multi-disk pack of the clutch E. In another variant, it can also be provided that the multi-disk pack of the clutch E is, viewed in an axial direction, also arranged radially over the multi-disk pack of the clutch F, or also that the multi-disk pack of the clutch E is, viewed in an axial direction, arranged radially over the multi-disk pack of the clutch C, and the multi-disk pack of the clutch D is, viewed in an axial direction, arranged radially over the multi-disk pack of the clutch F.

In an advantageously simple manner, the clutch C may be supplied with means of pressure and lubricant by the drive shaft AN with minimum leakage loss. In a structurally simple manner, the clutch D may be supplied with means of pressure and lubricant by the output shaft AB with minimum leakage loss, through the planetary gear carrier ST3 of the third planetary gear set RS3 constantly connected to the output shaft AB. The clutches E and F, for example, may be supplied with means of pressure and lubricant by the input shaft AN coming through a section of the shaft 5 rotatably mounted on the drive shaft AN or, for example, by the output shaft AB coming through a section of the drive shaft 5 rotatably mounted on the output shaft AB.

As already indicated, the spatial arrangement of the shift elements shown in FIG. 1 must be understood as an example. Thus, depending on the installation space available for the installation in the transmission of the vehicle, it may be expedient to arrange individual or several of the shift elements in a manner different from the exemplary embodiment shown here.

As is also shown in FIG. 1, each of the planetary gear sets RS1, RS4 and RS2 is completely reached through centrically in an axial direction only by the drive shaft AN (or the shaft 1). This is advantageous for the dimensioning of the drive shaft AN and the gear sets, but is also advantageous for the structural arrangement of the feed of lubricant to the planetary gears of the planetary gear sets and for the structural arrangement of the feed of means of pressure and lubricant to the clutches. Thereby, in its axial progression, the drive shaft AN reaches through the third shaft 3 and the seventh shaft 7. As also shown in FIG. 1, in its axial progression, the shaft 6 of the transmission, which forms the operative connection between the planetary gear carrier ST1 of the first planetary gear set RS1 (arranged on the input side of the transmission housing) and the ring gear HO3 of the third planetary gear set RS3 (arranged on the output side of the transmission housing), completely reaches beyond the second and fourth planetary gear sets RS2, RS4 along with the four clutches E, F, C, D. The shaft 8 extends centrally inside the shaft 6, while the shaft 9 extends centrally inside the shaft 9.

Figure 2:
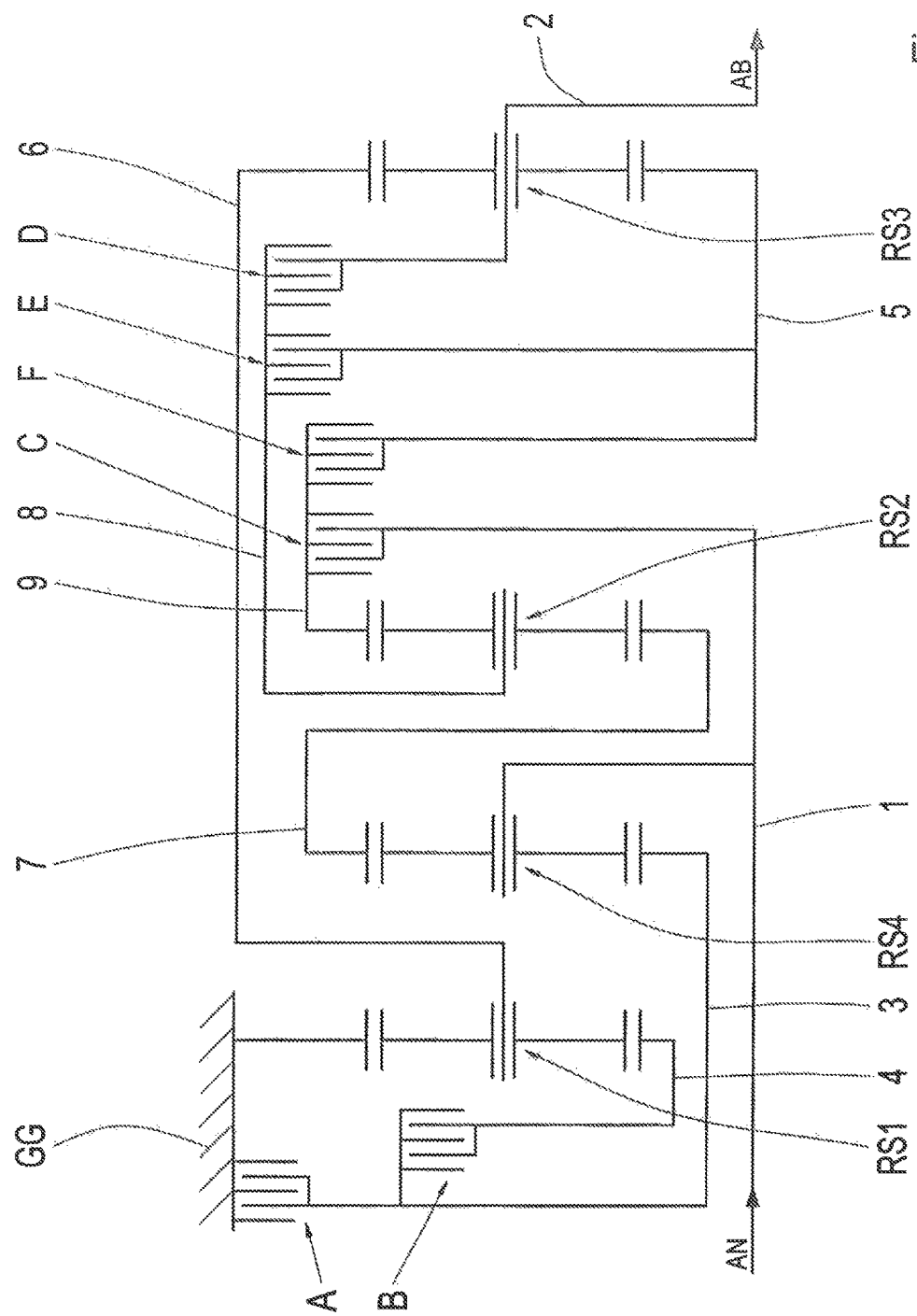
FIG. 2 provides a schematic presentation of a second exemplary embodiment of a 10-speed automatic transmission in accordance with aspects of the invention.

FIG. 2 shows the gear set diagram of a second exemplary embodiment of the 10-speed automatic transmission in accordance with aspects of the invention, derived from the exemplary transmission diagram in accordance with FIG. 1. The differences with the exemplary transmission diagram in accordance with FIG. 1 concern only the kinematic coupling of the first planetary gear set RS1 and the second shift element B to other transmission components.

As shown in FIG. 2, the ring gear HO1 of the first planetary gear set RS1 is now constantly connected to the transmission GG in a torque-proof or torsionally flexible manner. Similar to FIG. 1, the sun gear SO4 of the fourth planetary gear set RS4 forms the third shaft 3 of the automatic transmission. The sun gear SO1 of the first planetary gear set RS1 now forms the fourth shaft 4 of the automatic transmission constantly connected to the second shift element B. Such fourth shaft 4 is now connectable to the third shaft 3 of the automatic transmission through the second shift element B, now formed as a clutch. As shown in FIG. 1, the ring gear HO3 of the third planetary gear set RS3, as the sixth shaft 6 of the automatic transmission, is constantly connected to the planetary gear carrier ST1 of the first planetary gear set RS1. In contrast to the exemplary automatic transmission in accordance with FIG. 1, with the exemplary automatic transmission in accordance with FIG. 2, the second shift element is arranged in the power flow between the fourth shaft 4 (now the sun gear SO1 of the first planetary gear set RS1) and the third shaft 3 (the sun gear SO4 of the fourth planetary gear set RS4). Thus, the sun gears SO1 and SO4 are connectable to each other through the engaging of the second shift element B, while the sun gears SO1 and SO4 can be fixed to the transmission GG through the simultaneous engaging of the first shift element A and the second shift element B.

Thus, in contrast to the exemplary automatic transmission in accordance with FIG. 1, the exemplary automatic transmission in accordance with FIG. 2 features only two clutch shafts, through which the individual planetary gear sets are each constantly connected to each other, namely the aforementioned sixth shaft 6 for the constant coupling of the planetary gear carrier of the first planetary gear set RS1 with the ring gear HO3 of the third planetary gear set RS3, along with the seventh shaft 7 for the constant coupling of the sun gear SO2 of the second planetary gear set RS2 with the ring gear HO4 of the fourth planetary gear set RS4.

As also shown in FIG. 2, all four planetary gear sets RS1 to RS4 are formed, as in FIG. 1, as simple negative planetary gear sets, and are arranged, viewed spatially, coaxially next to each other with the defined order of "first, fourth, second, third planetary gear set" (thus, the arrangement of "RS1-RS4-RS2-RS3"). Moreover, the spatial arrangement of the shift element A designed as a brake and the spatial arrangement of the four shift elements C to F designed as clutches were taken from FIG. 1 without any change.

In contrast to FIG. 1, the brake A and the clutch B are arranged, viewed spatially, axially next to the first planetary gear set RS1, on the side of the planetary gear set RS1 that is turned away from the planetary gear set RS4. The brake A is arranged, without any change, on a relatively large diameter in the area of the outer diameter of the transmission GG, and may be supplied with means of pressure and coolant by the transmission housing GG in a simple manner. Viewed spatially, the clutch B is arranged axially between the inner multi-disk carrier of brake A and the first planetary gear set RS1. The clutch C may be supplied with means of pressure and lubricant, for example, by the drive shaft AN through the third shaft 3 radially enclosing the drive shaft AN.

If, by way of derogation from FIG. 2, the clutch B is formed as a claw coupling, this may also be arranged, viewed spatially, at least partially centrically within the sun gear SO1 of the first planetary gear set RS1, and thereby may radially enclose one section of the third shaft 3.

Figure 3:
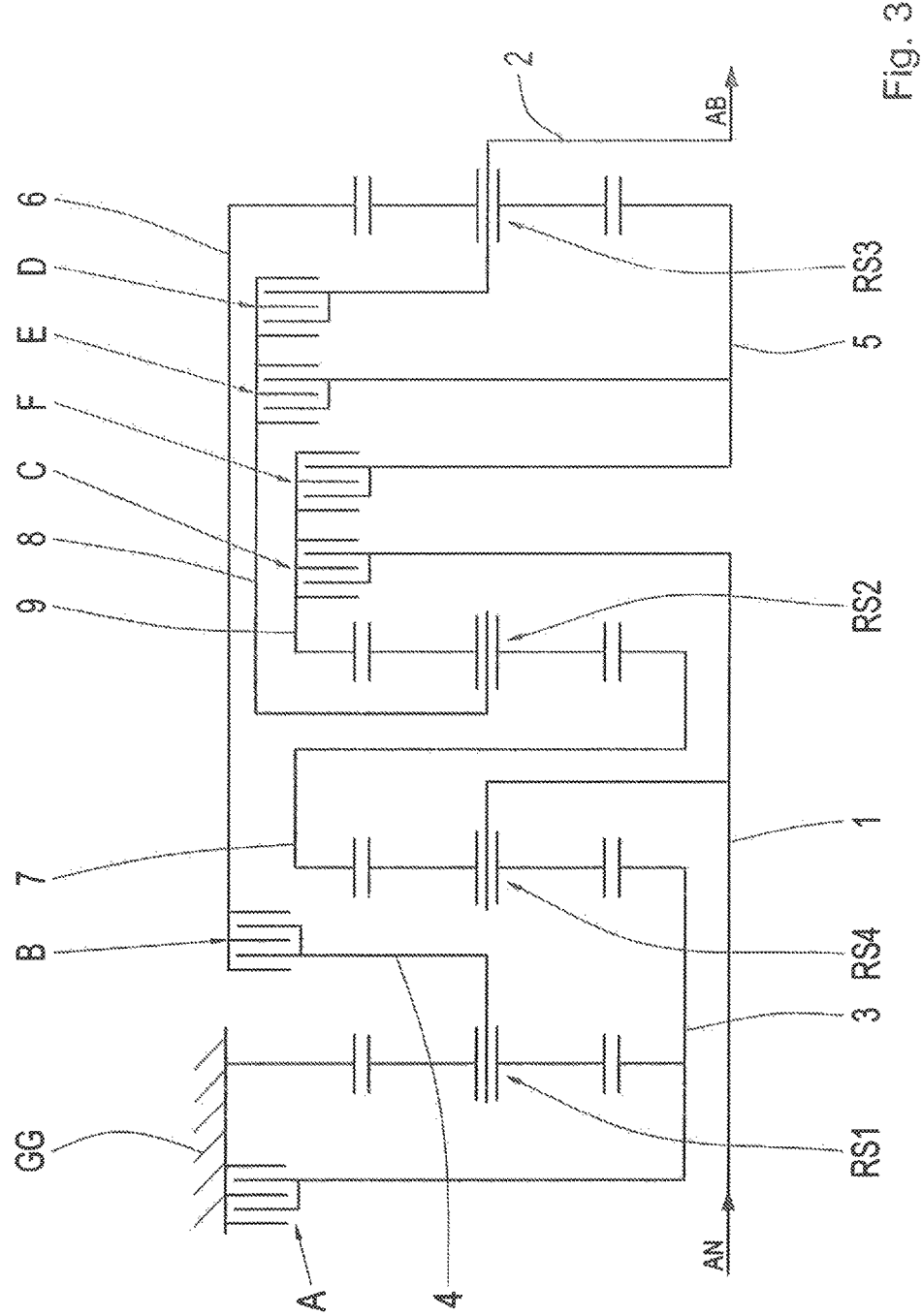
FIG. 3 provides a schematic presentation of a third exemplary embodiment of a 10-speed automatic transmission in accordance with aspects of the invention.

FIG. 3 shows the gear set diagram of a third exemplary embodiment of the 10-speed automatic transmission in accordance with aspects of the invention, likewise derived from the exemplary transmission diagram in accordance with FIG. 1. The differences with the exemplary transmission diagram in accordance with FIG. 1 in turn relates to only the kinematic coupling of the first planetary gear set RS1 and the second shift element B to other transmission components.

As shown in FIG. 3, the ring gear HO1 of the first planetary gear set RS1 is now constantly connected to the transmission housing GG in a torque-proof or torsionally flexible manner. As shown in FIG. 1, the sun gear SO4 of the fourth planetary gear set RS4 is, as the third shaft 3 of the automatic transmission, constantly connected to the sun gear SO1 of the first planetary gear set RS1, such that the sun gears SO1 and SO4 together can be fixed to the transmission GG through the engaging of the first shift element A. The planetary gear carrier ST1 of the first planetary gear set RS1 now forms the fourth shaft 4 of the automatic transmission constantly connected to the second shift element B. This fourth shaft 4 is now connectable to the sixth shaft 6 of the automatic transmission through the second shift element B now formed as a clutch, whereas the sixth shaft 6 on its part is formed by the ring gear HO3 of the third planetary gear set RS3. In contrast to the exemplary automatic transmission in accordance with FIG. 1, with the exemplary automatic transmission in accordance with FIG. 3, the second shift element is arranged in the power flow between the fourth shaft 4 (now the planetary gear carrier ST1 of the first planetary gear set RS1) and the sixth shaft 6 (the ring gear HO3 of the third planetary gear set RS3).

Thus, in contrast to the exemplary automatic transmission in accordance with FIG. 1, the exemplary automatic transmission in accordance with FIG. 3 features only two clutch shafts, through which the individual planetary gear sets are constantly connected to each other, namely the aforementioned third shaft 3 for the constant coupling of the sun gear SO1 of the first planetary gear set RS1 with the sun gear SO4 of the fourth planetary gear set RS4, along with the seventh shaft 7 for the constant coupling of the sun gear SO2 of the second planetary gear set RS2 with the ring gear HO4 of the fourth planetary gear set RS4.

As also shown in FIG. 3, all four planetary gear sets RS1 to RS4 are formed, as in FIG. 1, as simple negative planetary gear sets, and are arranged, viewed spatially, coaxially next to each other with the defined order of "first, fourth, second, third planetary gear set" (thus, the arrangement of "RS1-RS4-RS2-RS3"). Moreover, the spatial arrangement of the shift element A designed as a brake and the spatial arrangement of the four shift elements C to F designed as clutches were taken from FIG. 1 without any change.

In contrast to FIG. 1, the clutch B is arranged, viewed spatially, in an area axially between the first planetary gear set RS1 and the fourth planetary gear set RS4. The clutch B may be supplied with means of pressure and lubricant, for example, by the drive shaft AN through the third shaft 3 radially enclosing the drive shaft AN and the planetary gear carrier ST1 of the first planetary gear set RS1 radially enclosing the drive shaft 3.

If, by way of derogation from FIG. 3, the clutch B is formed as a claw coupling, this may also be arranged, viewed spatially, on a small diameter in the area axially between the sun gears SO1 and SO4, and thereby may radially enclose this section of the third shaft 3.

Figure 4:
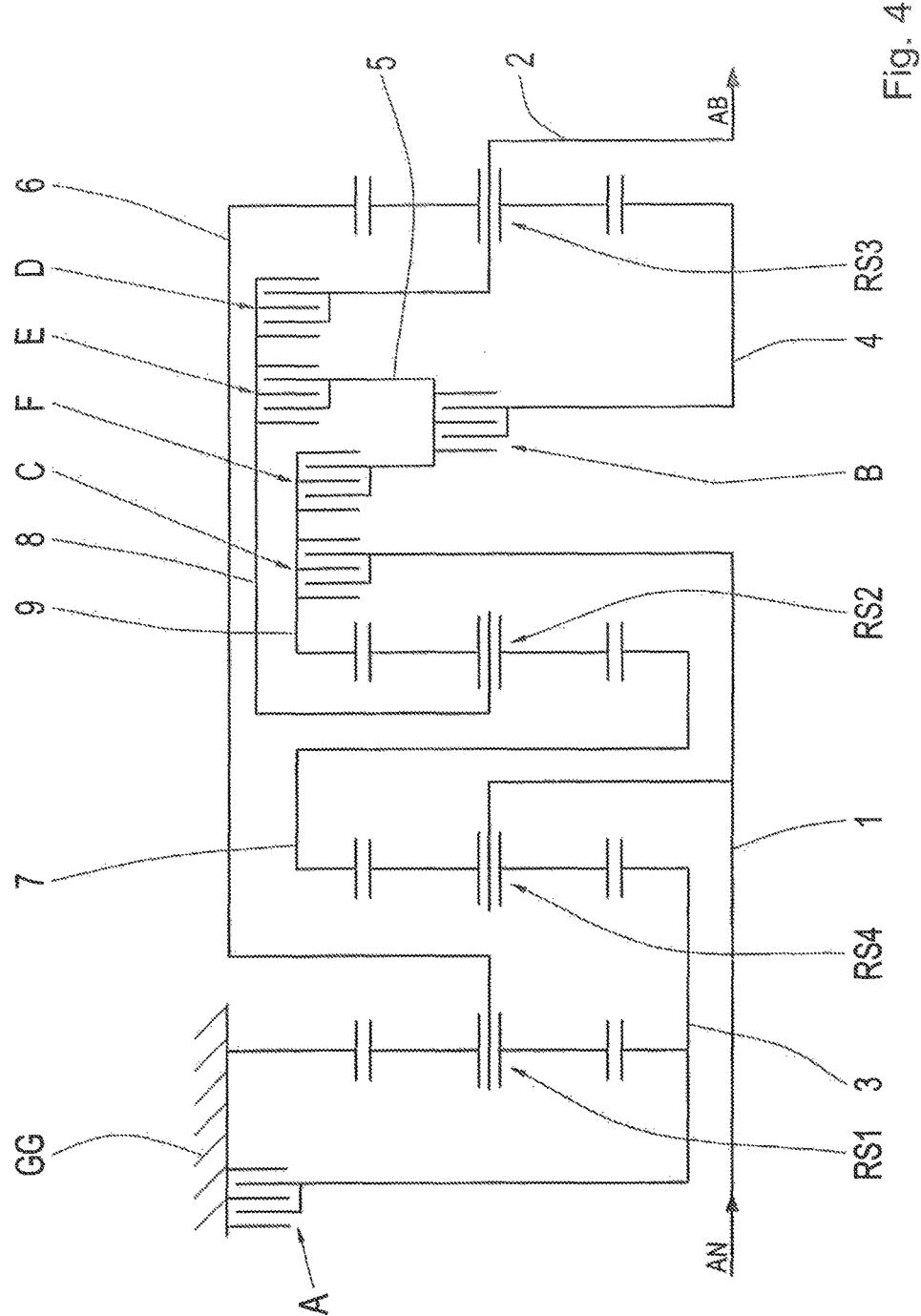
FIG. 4 provides a schematic presentation of a fourth exemplary embodiment of a 10-speed automatic transmission in accordance with aspects of the invention.

FIG. 4 shows the gear set diagram of a fourth exemplary embodiment of the 10-speed automatic transmission in accordance with aspects of the invention, likewise derived from the exemplary transmission diagram in accordance with FIG. 1. The differences with the exemplary transmission diagram in accordance with FIG. 1 in turn relates to only the kinematic coupling of the first planetary gear set RS1 and the second shift element B to other transmission components.

As shown in FIG. 4, the ring gear HO1 of the first planetary gear set RS1 is now constantly connected to the transmission GG in a torque-proof or torsionally flexible manner. As shown in FIG. 1, the sun gear SO4 of the fourth planetary gear set RS4 is, as the third shaft 3 of the automatic transmission, constantly connected to the sun gear SO1 of the first planetary gear set RS1, such that the sun gears SO1 and SO4 together can be fixed to the transmission housing GG through the engaging of the first shift element A. The sun gear SO3 of the third planetary gear set RS3 now forms the fourth shaft 4 of the automatic transmission, which is constantly connected to the second shift element B. This fourth shaft 4 is now connectable to the fifth shaft 5 of the automatic transmission through the second shift element B now formed as a clutch, whereas the fifth shaft 5 on its part now does not feature a constant connection to one of the elements of the planetary gear sets. As shown in FIG. 1, the ring gear HO3 of the third planetary gear set RS3 is, as the sixth shaft 6 of the automatic transmission, constantly connected to the planetary gear carrier ST1 of the first planetary gear set RS1. In contrast to the exemplary automatic transmission in accordance with FIG. 1, with the exemplary automatic transmission in accordance with FIG. 4, the second shift element is arranged in the power flow between the fourth shaft 4 (now the sun gear SO3 of the third planetary gear set RS3) and the fifth shaft 5 (now without a direct connection to one of the elements of the planetary gear set). Thereby, the first shaft 1 (input shaft AN) is still connectable to the fifth shaft 5 through the simultaneous engaging of the third and sixth shift elements C, F; however, so that the sun gear SO3 (now the fourth shaft 4) of the third planetary gear set RS3 can rotate with the rotational speed of the input shaft AN, the simultaneous engaging of the second, third and sixth shift elements B, C, F is necessary.

Thus, the exemplary automatic transmission in accordance with FIG. 4 features the same three clutch shafts as the exemplary automatic transmission in accordance with FIG. 1, namely the third, sixth and seventh shafts 3, 6, 7.

As also shown in FIG. 4, all four planetary gear sets RS1 to RS4 are formed, as in FIG. 1, as simple negative planetary gear sets, and are arranged, viewed spatially, coaxially next to each other with the defined order of "first, fourth, second, third planetary gear set" (thus, the arrangement of "RS1-RS4-RS2-RS3"). Moreover, the spatial arrangement of the shift element A designed as a brake and the spatial arrangement of the four shift elements C to F designed as clutches were taken from FIG. 1 without any change.

In contrast to FIG. 1, the clutch B is, viewed spatially, arranged in an area axially between the second planetary gear set RS2 and the third planetary gear set RS3, viewed spatially, in an area radially below the multi-disk packs of the two clutches E and F. In an advantageous manner in terms of production technology, a common multi-disk carrier is provided for these three clutches B, E, F; it forms the fifth shaft 5 and is designed here, by way of example, as an inner multi-disk carrier of the clutches E, F, and as an outer multi-disk carrier of the clutch B. The three clutches B, E, F, for example, may be supplied with means of pressure and lubricant by the input shaft AN through a section of the fifth shaft 5 radially mounted on or in the input shaft AN.

If, by way of derogation from FIG. 4, the clutch B is formed as a claw coupling, it may also be arranged, viewed spatially, on a small diameter in the area radially under the clutch D axially adjacent to the sun gear SO3 of the third planetary gear set RS3, alternatively at least partially centrally within the sun gear SO3 of the third planetary gear set RS3.

FIG. 5 presents an exemplary shifting diagram of the 10-speed automatic transmission in accordance with aspects of the invention in accordance with FIGS. 1 to 4. In each gear, four shift elements are engaged and two shift elements open, which—a result of the minimization of drag losses that must arise on open frictional shift elements—has a very positive effect on the efficiency of the transmission. In addition to the shifting logic, it may also be taken from the shifting diagram that, upon a sequential shifting operation, thus upon upshifts and downshifts by one gear, so-called "group gearshifts" can be avoided, since two gears adjacent in the shifting logic always jointly use two shift elements. The eighth forward gear is formed as a direct gear, such that two so-called "overdrive forward gears" are available.

Of course, the transmission diagrams previously presented in FIGS. 1 to 4 can also be presented with a different spatial arrangement of the four planetary gear sets RS1, RS2, RS3, RS4, without changing the respective kinematics of the transmission. A suitable alternative spatial arrangement of the planetary gear sets, is, for example, the arrangement of the four planetary gear sets RS1, RS2, RS3, RS4 coaxially next to each other with the defined order of "second, fourth, first, third planetary gear sets" (thus, the arrangement of "RS2-RS4-RS1-RS3"). This arrangement is particularly suitable for a transmission with which the drive shaft AN and the output shaft AB are not arranged coaxially with each other, as for example the case with a so-called "front-transverse installation" in the vehicle.

Moreover, the spatial arrangements of the shift elements within the transmission housing previously proposed in FIGS. 1 to 4 have an exemplary nature. If necessary and depending on the given structural options, the specialist will also realize meaningful alternatives for the arrangement of the shift elements.

Based on the finding that, in principle, it is possible to replace a so-called "negative planetary gear set" with a kinematically equivalent positive planetary gear set, to the extent that space allows for the coupling of the sun gear, planetary gear carrier and ring gear of such planetary gear set to the other planetary gear sets and shift elements and, where appropriate, to the housing, FIG. 6 shows a table in which technically meaningful combinations of types of planetary gear set for the transmission diagrams shown in FIGS. 1 to 4 are listed. All of the variants listed in the table may shift, through the shifting logic shown in FIG. 5, ten forward gears and one reverse gear.

Figure 10:
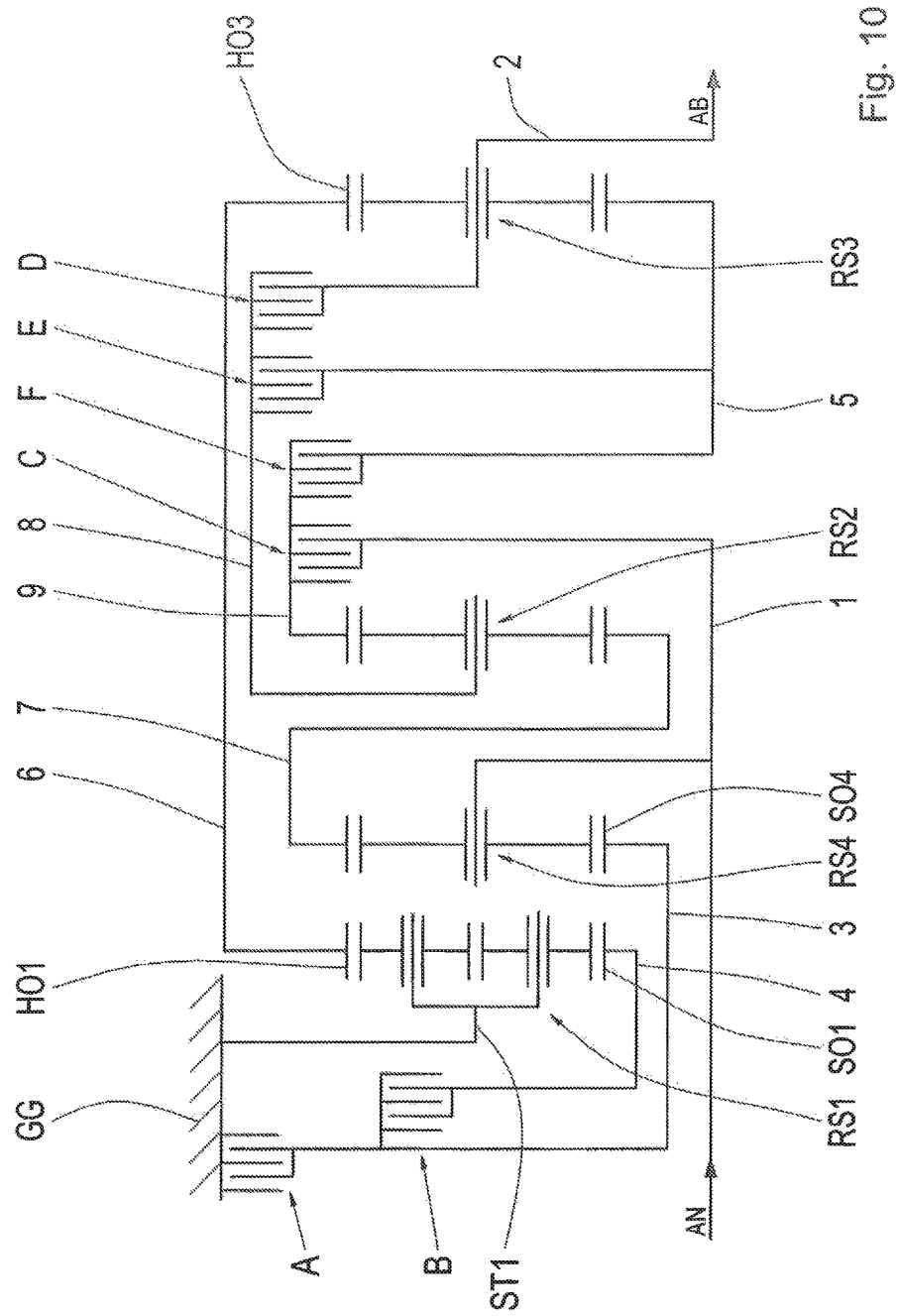
FIG. 10 provides a schematic presentation of a first exemplary alternative to the exemplary transmission in accordance with FIG. 2.

As is well-known, with a negative planetary gear set, each of its planetary gears meshes with both the sun gear and the ring gear, while, with a positive planetary gear set, each of its inner planetary gears meshes with one of its outer planetary gears and the sun gear, and each of its outer planetary gears meshes with one of its inner planetary gears and the ring gear. FIG. 10 shows that it is not technically sensible to design the third planetary gear set RS3 constantly connected to the output shaft as a positive planetary gear set, while the formation or one or more of the other three planetary gear sets RS1, RS2 and RS4 leads to technically usable results. Three examples of such variation options are described in more detail below.

Figure 7:
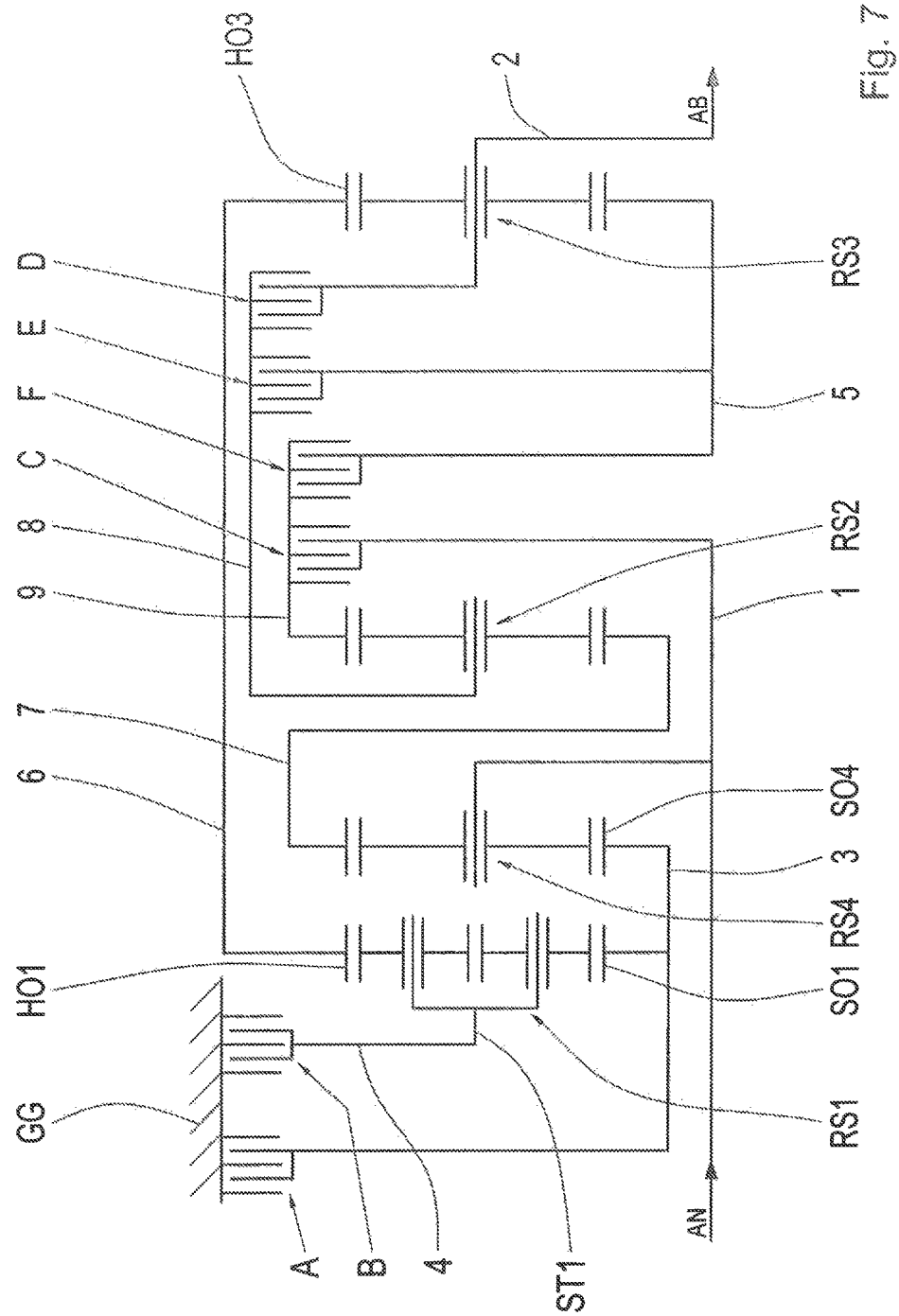
FIG. 7 provides a schematic presentation of a first exemplary alternative to the exemplary transmission in accordance with FIG. 1.

FIG. 7 shows a schematic presentation of a first exemplary alternative to the transmission diagram shown in FIG. 1. In contrast to the exemplary transmission diagram in accordance with FIG. 1, with which all four planetary gear sets are designed as negative planetary gear sets, in the exemplary transmission diagram in accordance with FIG. 7, the first planetary gear set RS1 is designed as a positive planetary gear set, while the other three planetary gear sets RS2, RS3, RS4 are designed as planetary gear sets, without any change. Viewed spatially, the sequence of the four individual planetary gear sets in FIG. 7, arranged coaxially adjacent to each other, is unchanged in respect of FIG. 1, and this is likewise the case for the spatial arrangement of all six shift elements A to F, such that, in order to avoid repetitions, only the major differences from FIG. 1 need further clarification in the description of FIG. 7.

In order to maintain the kinematics of the exemplary gear set system in accordance with FIG. 1, the following is provided in FIG. 7: without any change, the sun gear SO1 forms the first element of the first planetary gear set RS1, which is constantly and directly connected to both the sun gear SO4 of the fourth planetary gear set RS4 and the brake A through the third shaft 3 of the automatic transmission (which acts as the first clutch shaft), thus can be fixed to the transmission GG through this brake A (together with the sun gear SO4). The ring gear HO1 now forms the second element of the first planetary gear set RS1, which is constantly connected to the third element (ring gear HO3) of the third planetary gear set RS3 through the sixth shaft 6 (which acts as the second clutch shaft). The planetary gear carrier ST1 now forms the third element of the first planetary gear set RS1, which is constantly and directly connected to the brake B and can be fixed to the housing GG through such brake B.

Figure 8:
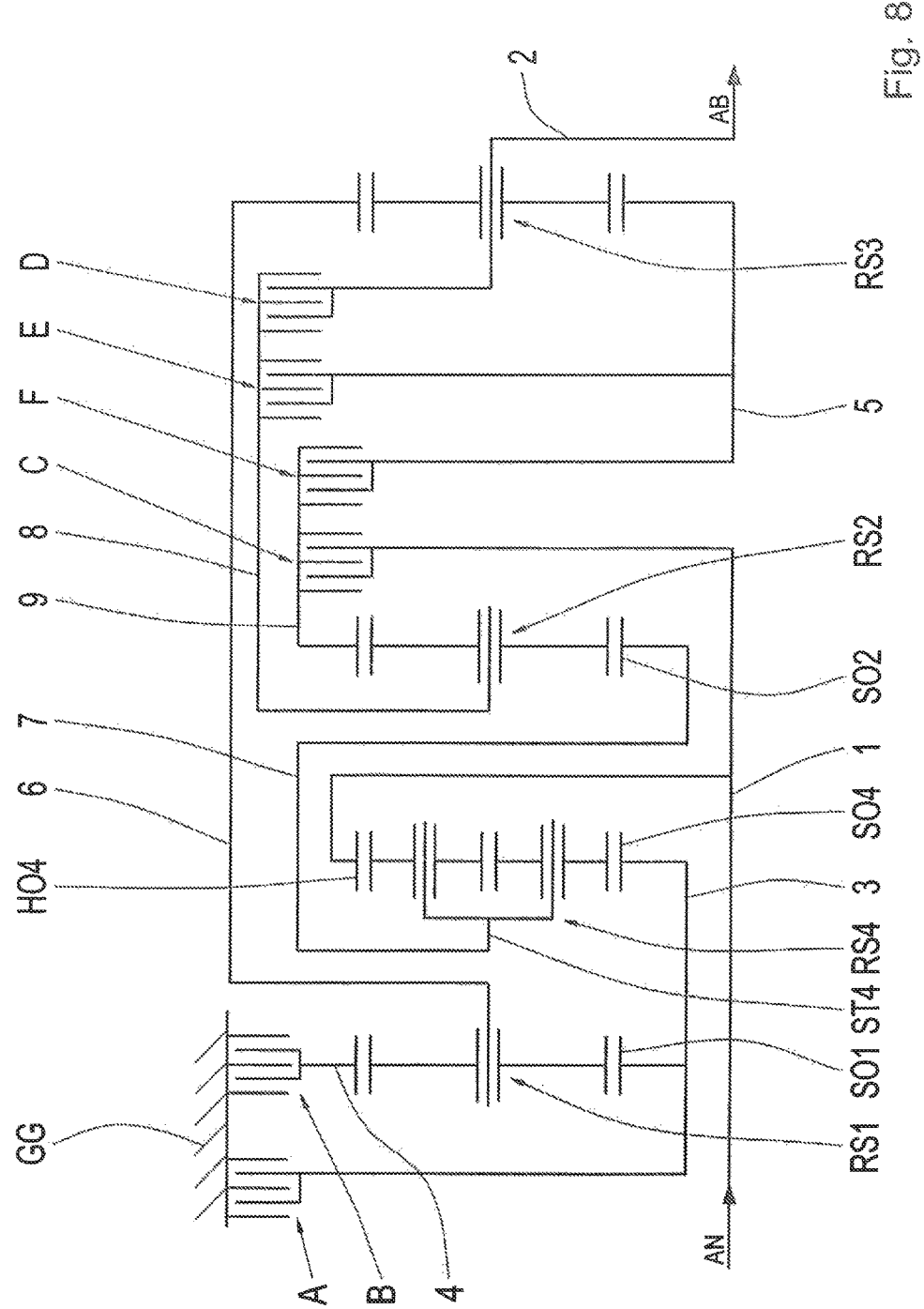
FIG. 8 provides a schematic presentation of a second exemplary alternative to the exemplary transmission in accordance with FIG. 1.

FIG. 8 shows a schematic presentation of a second exemplary alternative to the transmission diagram shown in FIG. 1. In contrast to the exemplary transmission diagram in accordance with FIG. 1, with which all four planetary gear sets are designed as negative planetary gear sets, in the exemplary transmission diagram in accordance with FIG. 8, the fourth planetary gear set RS4 is designed as a positive planetary gear set, while the other three planetary gear sets RS1, RS2, RS3 are designed as planetary gear sets, without any change. Viewed spatially, the sequence of the four individual planetary gear sets in FIG. 8, arranged coaxially adjacent to each other, is unchanged in respect of FIG. 1, and this is likewise the case for the spatial arrangement of all six shift elements A to F, such that, in order to avoid repetitions, only the major differences from FIG. 1 need further clarification in the description of FIG. 8.

In order to maintain the kinematics of the exemplary gear set system in accordance with FIG. 1, the following is provided in FIG. 8: without any change, the sun gear SO4 forms the first element of the fourth planetary gear set RS4, which is constantly and directly connected to both the sun gear SO1 of the first planetary gear set RS1 and the brake A through the third shaft 3 of the automatic transmission (which acts as the first clutch shaft), thus can be fixed to the transmission GG through this brake A (together with the sun gear SO1). The ring gear HO4 now forms the second element of the fourth planetary gear set RS4, which, as the first shaft 1 of the automatic transmission, is designed as an input shaft AN or is constantly connected to the input shaft AN. The planetary gear carrier ST4 now forms the third element of the fourth planetary gear set RS4, which is constantly connected to the first element (sun gear SO2) of the second planetary gear set RS2 through the seventh shaft 7 of the automatic transmission (which acts as the third clutch shaft).

Figure 9:
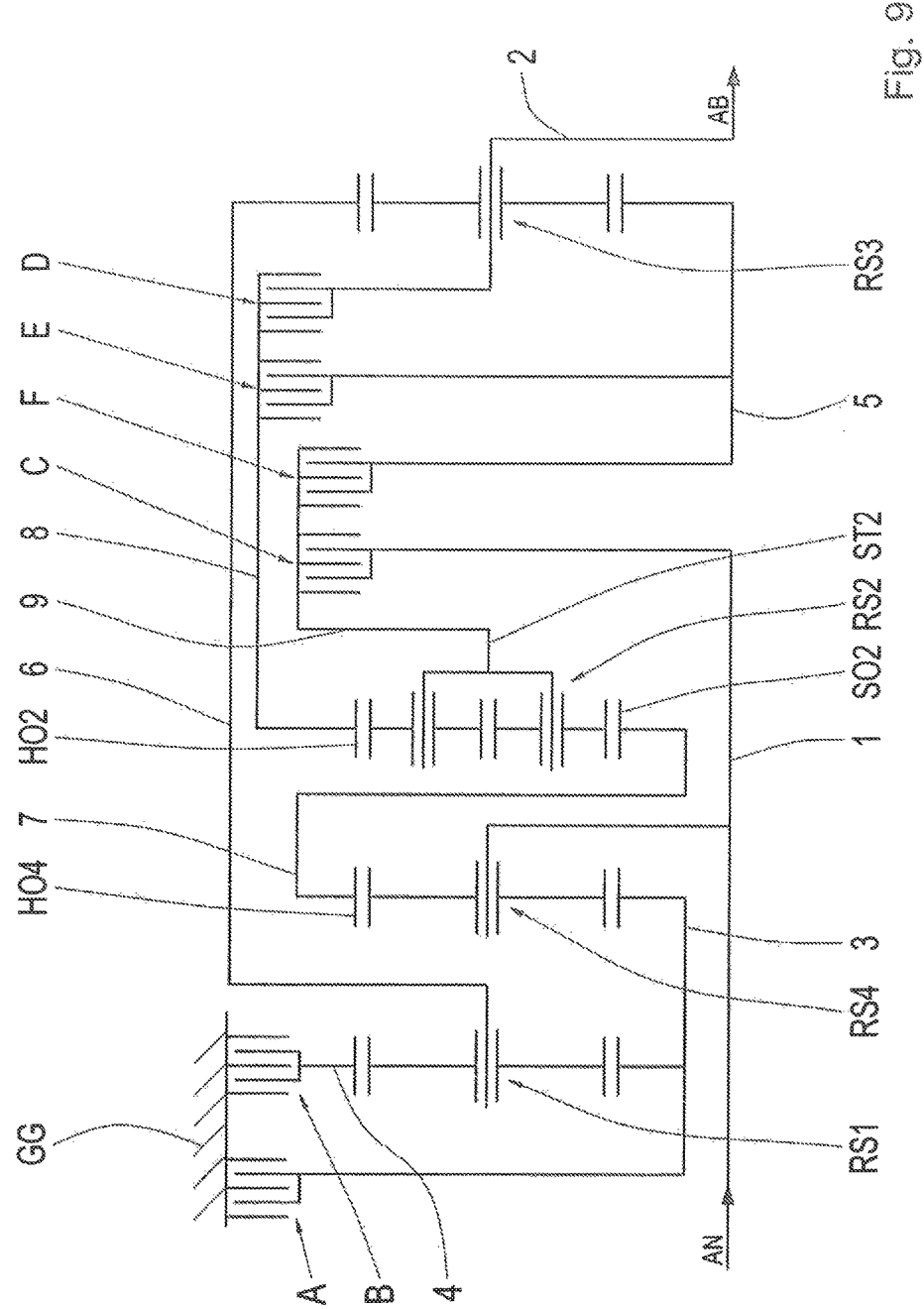
FIG. 9 provides a schematic presentation of a third exemplary alternative to the exemplary transmission in accordance with FIG. 1.

FIG. 9 shows a schematic presentation of a third exemplary alternative to the transmission diagram shown in FIG. 1. In contrast to the exemplary transmission diagram in accordance with FIG. 1, with which all four planetary gear sets are designed as negative planetary gear sets, in the exemplary transmission diagram in accordance with FIG. 9, the second planetary gear set RS2 is designed as a positive planetary gear set, while the other three planetary gear sets RS1, RS3, RS4 are designed as planetary gear sets, without any change. Viewed spatially, the sequence of the four individual planetary gear sets in FIG. 9, arranged coaxially adjacent to each other, is unchanged in respect of FIG. 1, and this is likewise the case for the spatial arrangement of all six shift elements A to F, such that, in order to avoid repetitions, only the major differences from FIG. 1 need further clarification in the description of FIG. 9.

In order to maintain the kinematics of the exemplary gear set system in accordance with FIG. 1, the following is provided in FIG. 9: without any change, the sun gear SO2 forms the first element of the second planetary gear set RS2, which is constantly connected to the third element (ring gear HO4) of the fourth planetary gear set RS4 through the seventh shaft 7 of the automatic transmission (which acts as third first clutch shaft). Now, the ring gear HO2 forms the second element of the second planetary gear set RS2, which, as the eighth shaft 8 of the automatic transmission, is constantly connected to the clutches D and E, is connectable to the second shaft (output shaft AB) through such clutch D and is connectable to the fifth shaft 5 (sun gear SO3 of the third planetary gear set RS3) through such clutch E. Now, the planetary gear carrier ST2 forms the third element of the second planetary gear set RS2, which, as the ninth shaft 9 of the automatic transmission is constantly connected to the clutch C and F, is connectable to the first shaft (input shaft IN) through such clutch C and is connectable to the fifth shaft 5 (sun gear SO3 of the third planetary gear set RS3) through such clutch F. If the second planetary gear set RS2 is blocked, such that all three elements of the planetary gear set RS2 rotate with the same rotational speed, the clutches E and F, which are arranged in a row one behind the other in the direction of the power flow, must be engaged at the same time, by which the ring gear HO2 and the planetary gear carrier ST2 of the second planetary gear set RS2 are then connected to each other.

In knowledge of these three exemplary alternatives, described as examples, to the transmission diagram shown in FIG. 1, the specialist will easily generate alternatives with several positive planetary gear sets other than those listed in the table of FIG. 6. Thereby, in order to maintain the kinematics of the gear set system, only the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

The possibilities of replacing one of the negative planetary gear sets with a positive planetary gear set, as previously described with the example of the transmission kinematics in accordance with FIG. 1, can also be transferred to the exemplary transmission kinematics in accordance with FIG. 2, the exemplary transmission kinematics in accordance with FIG. 3 and the exemplary transmission kinematics in accordance with FIG. 4. The same applies to the replacement of several of the negative planetary gear sets with positive planetary gear sets. This is to be described in more detail below on the basis of FIGS. 10 to 18.

FIG. 10 shows a schematic presentation of a first exemplary alternative to the transmission diagram shown in FIG. 2. In contrast to the exemplary transmission diagram in accordance with FIG. 2, with which all four planetary gear sets are designed as negative planetary gear sets, in the exemplary transmission diagram in accordance with FIG. 10, the first planetary gear set RS1 is designed as a positive planetary gear set, while the other three planetary gear sets RS2, RS3, RS4 are designed as planetary gear sets, without any change. Viewed spatially, the sequence of the four individual planetary gear sets in FIG. 10, arranged coaxially adjacent to each other, is unchanged in respect of FIG. 2, and this is likewise the case for the spatial arrangement of all six shift elements A to F, such that, in order to avoid repetitions, only the major differences from FIG. 2 need further clarification in the description of FIG. 10.

In order to maintain the kinematics of the exemplary gear set system in accordance with FIG. 2, the following is provided in FIG. 10: without any change, the sun gear SO1 forms the first element of the first planetary gear set RS1, which, as the fourth shaft 4 of the automatic transmission, is constantly and directly connected to the clutch B and is connectable to the third shaft 3 of the automatic transmission through this clutch B. The first element of the fourth planetary gear set RS4 forms such third shaft 3, which is constantly and directly connected to the brake B. The ring gear HO1 now forms the second element of the first planetary gear set RS1, which is connected to the third element (ring gear HO3) of the third planetary gear set RS3 through the sixth shaft 6 (which acts as the first clutch shaft). The planetary gear carrier ST1 now forms the third element of the first planetary gear set RS1, which is constantly fixed to the housing GG.

Figure 11:
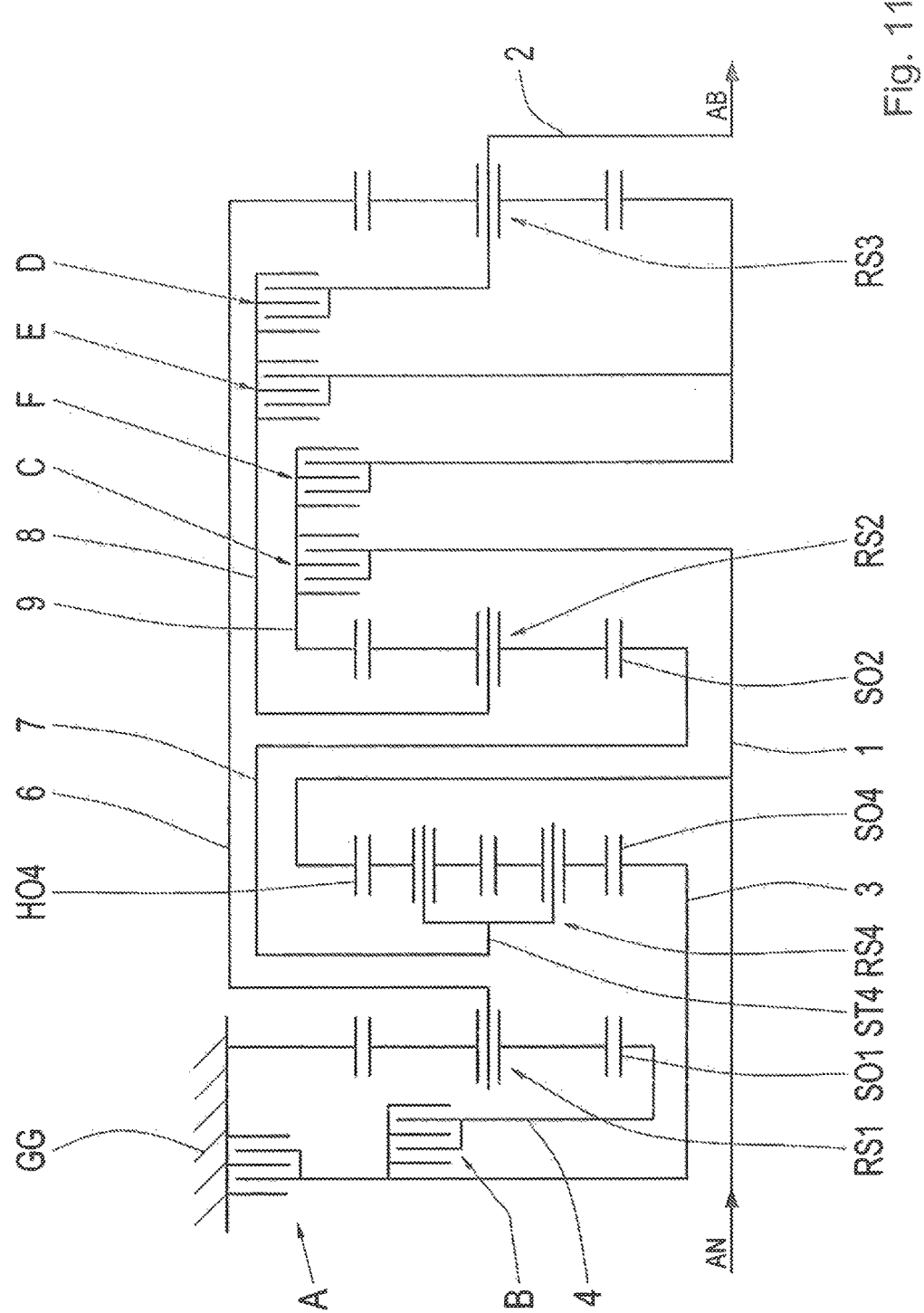
FIG. 11 provides a schematic presentation of a second exemplary alternative to the exemplary transmission in accordance with FIG. 2.

FIG. 11 shows a schematic presentation of a second exemplary alternative to the exemplary transmission diagram shown in FIG. 2. In contrast to the exemplary transmission diagram in accordance with FIG. 2, with which all four planetary gear sets are designed as negative planetary gear sets, in the exemplary transmission diagram in accordance with FIG. 11, the fourth planetary gear set RS4 is designed as a positive planetary gear set, while the other three planetary gear sets RS1, RS2, RS3 are designed as planetary gear sets, without any change. Viewed spatially, the sequence of the four individual planetary gear sets in FIG. 11, arranged coaxially adjacent to each other, is unchanged in respect of FIG. 2, and this is likewise the case for the spatial arrangement of all six shift elements A to F, such that, in order to avoid repetitions, only the major differences from FIG. 2 need further clarification in the description of FIG. 11.

In order to maintain the kinematics of the exemplary gear set system in accordance with FIG. 2, the following is provided in FIG. 11: without any change, the sun gear SO4 forms the first element of the fourth planetary gear set RS4, which, as the third shaft 3 of the automatic transmission, is constantly and directly connected to both the brake A and the clutch B, can thus be fixed to the transmission housing GG through this brake A and is connectable to the first element (sun gear SO1) of the first planetary gear set RS1 through this clutch B. The ring gear HO4 now forms the second element of the fourth planetary gear set RS4, which, as the first shaft 1 of the automatic transmission, is designed as an input shaft AN or is constantly connected to the input shaft AN. The planetary gear carrier ST4 now forms the third element of the fourth planetary gear set RS4, which is constantly connected to the first element (sun gear SO2) of the second planetary gear set RS2 through the seventh shaft 7 of the automatic transmission (which acts as the second clutch shaft).

Figure 12:
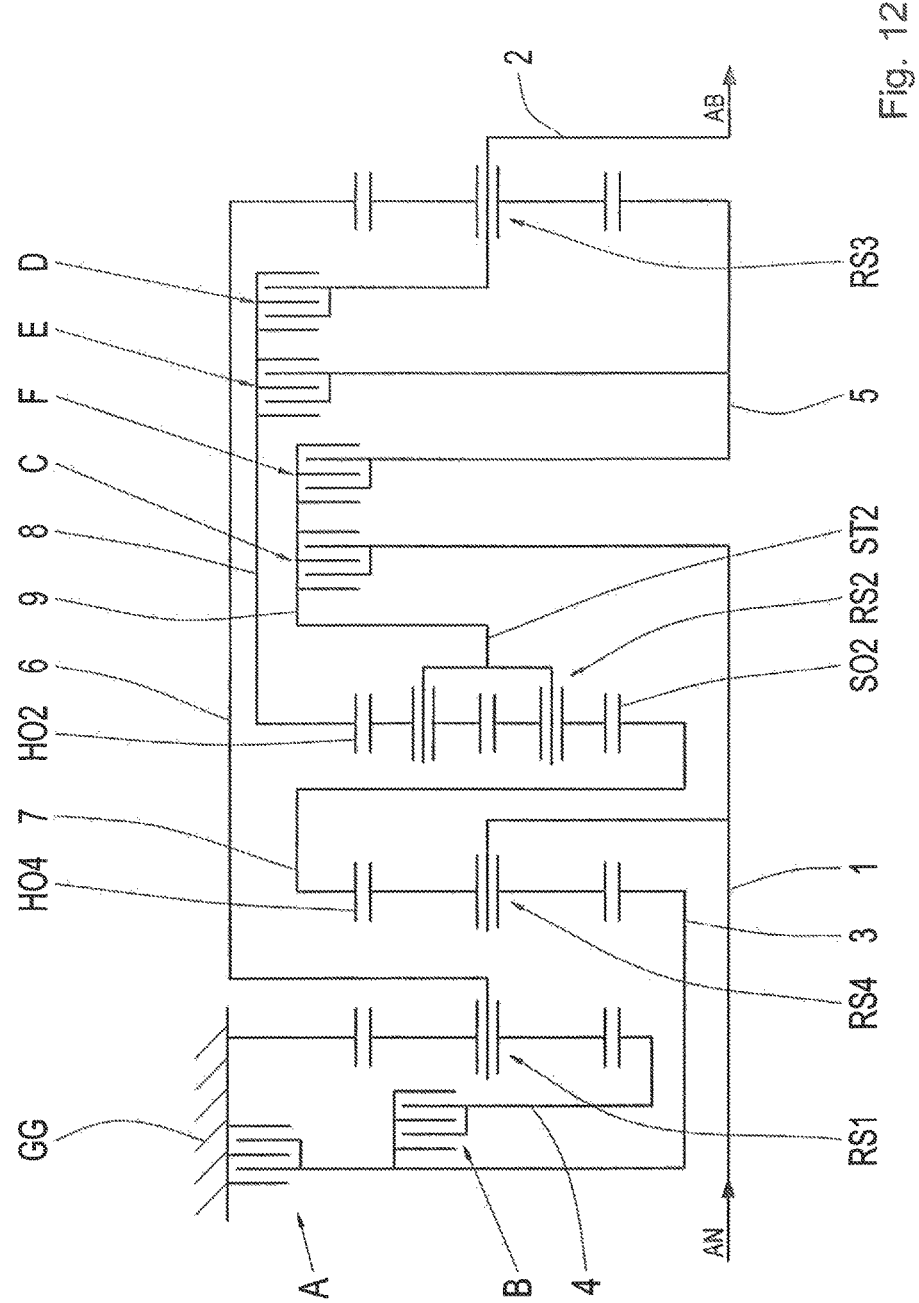
FIG. 12 provides a schematic presentation of a third exemplary alternative to the exemplary transmission in accordance with FIG. 2.

FIG. 12 shows a schematic presentation of a third exemplary alternative to the exemplary transmission diagram shown in FIG. 2. In contrast to the exemplary transmission diagram in accordance with FIG. 2, with which all four planetary gear sets are designed as negative planetary gear sets, in the exemplary transmission diagram in accordance with FIG. 12, the second planetary gear set RS2 is designed as a positive planetary gear set, while the other three planetary gear sets RS1, RS3, RS4 are designed as planetary gear sets, without any change. Viewed spatially, the sequence of the four individual planetary gear sets in FIG. 12, arranged coaxially adjacent to each other, is unchanged in respect of FIG. 2, and this is likewise the case for the spatial arrangement of all six shift elements A to F.

Figure 13:
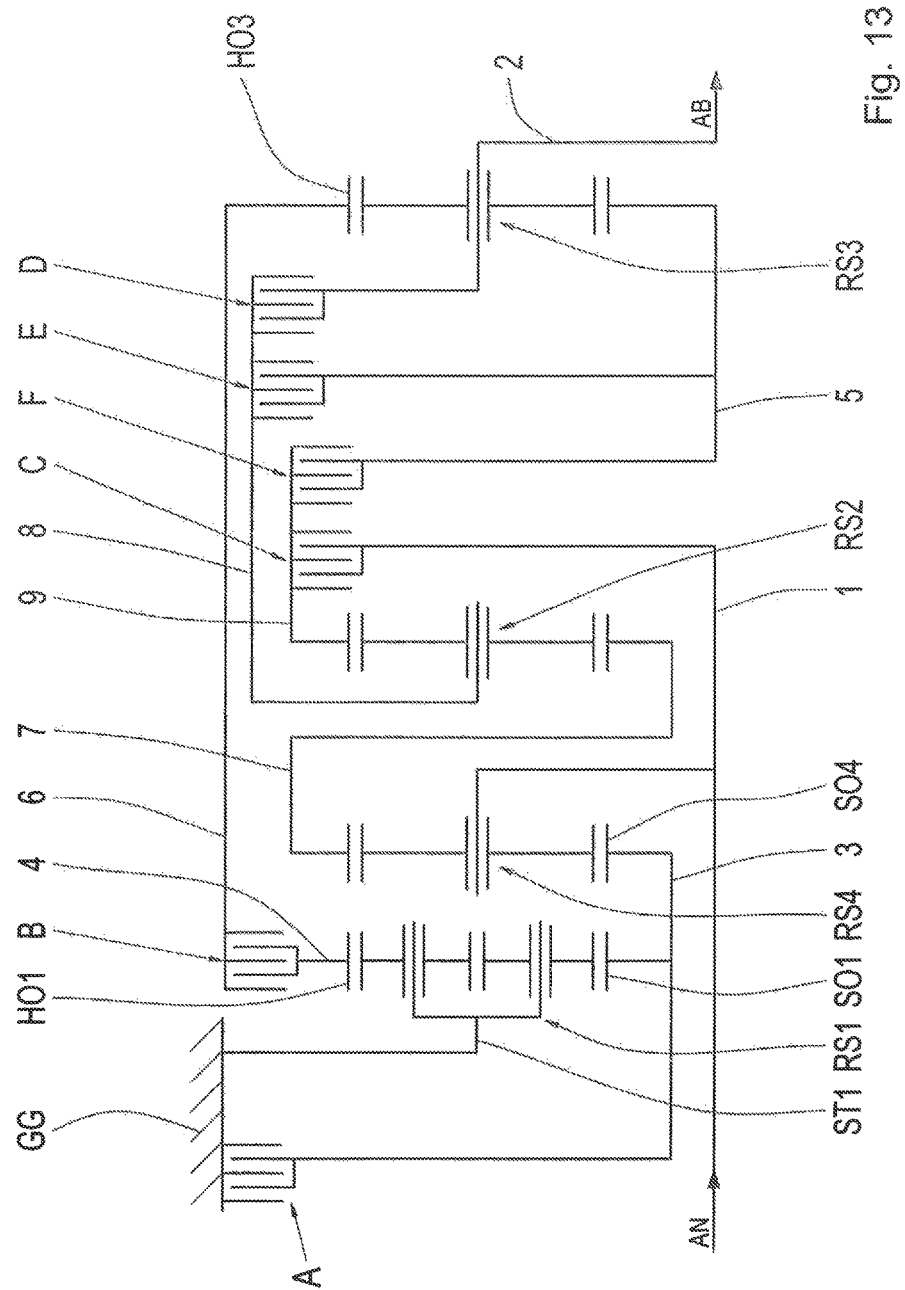
FIG. 13 provides a schematic presentation of a first exemplary alternative to the exemplary transmission in accordance with FIG. 3.

The structural adjustments caused by the transposition of the connection of the planetary gear carrier and ring gear of the positive planetary gear set in respect of the negative planetary gear set were already described on the basis of FIG. 9 and therefore do not require any repetition at this point, with the exception of the reference that the sixth shaft 6 in the exemplary transmission diagram in accordance with FIG. 12 acts as the first clutch shaft (and not as the second clutch shaft as in FIG. 9), and that the seventh shaft 7 in the exemplary transmission diagram in accordance with FIG. 12 acts as the second clutch shaft (and not as the third clutch shaft as in FIG. 13)

In knowledge of these three exemplary alternatives, described as examples, to the transmission diagram shown in FIG. 2, the specialist will easily generate alternatives with several positive planetary gear sets other than those listed in the table of FIG. 6. Thereby, in order to maintain the kinematics of the gear set system, only the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

FIG. 13 shows a schematic presentation of a first exemplary alternative to the transmission diagram shown in FIG. 3. In contrast to the exemplary transmission diagram in accordance with FIG. 3, with which all four planetary gear sets are designed as negative planetary gear sets, in the exemplary transmission diagram in accordance with FIG. 13, the first planetary gear set RS1 is designed as a positive planetary gear set, while the other three planetary gear sets RS2, RS3, RS4 are designed as planetary gear sets, without any change. Viewed spatially, the sequence of the four individual planetary gear sets in FIG. 13, arranged coaxially adjacent to each other, is unchanged in respect of FIG. 3, and this is likewise the case for the spatial arrangement of all six shift elements A to F, such that, in order to avoid repetitions, only the major differences from FIG. 3 need further clarification in the description of FIG. 13.

In order to maintain the kinematics of the exemplary gear set system in accordance with FIG. 3, the following is provided in FIG. 13: without any change, the sun gear SO1 forms the first element of the first planetary gear set RS1, which is constantly and directly connected to both the sun gear SO4 of the fourth planetary gear set RS4 and the brake A through the third shaft 3 of the automatic transmission (which acts as the first clutch shaft), thus can be fixed to the transmission GG through this brake A (together with the sun gear SO4). The ring gear HO1 now forms the second element of the first planetary gear set RS1, which, as the fourth shaft 4 of the automatic transmission, is constantly connected to the clutch B and is connectable to the sixth shaft 6 of the automatic transmission through such clutch B. The third element (ring gear HO3) of the third planetary gear set RS3 forms such sixth shaft 6. The planetary gear carrier ST1 now forms the third element of the first planetary gear set RS1, which is constantly fixed to the housing GG.

Figure 14:
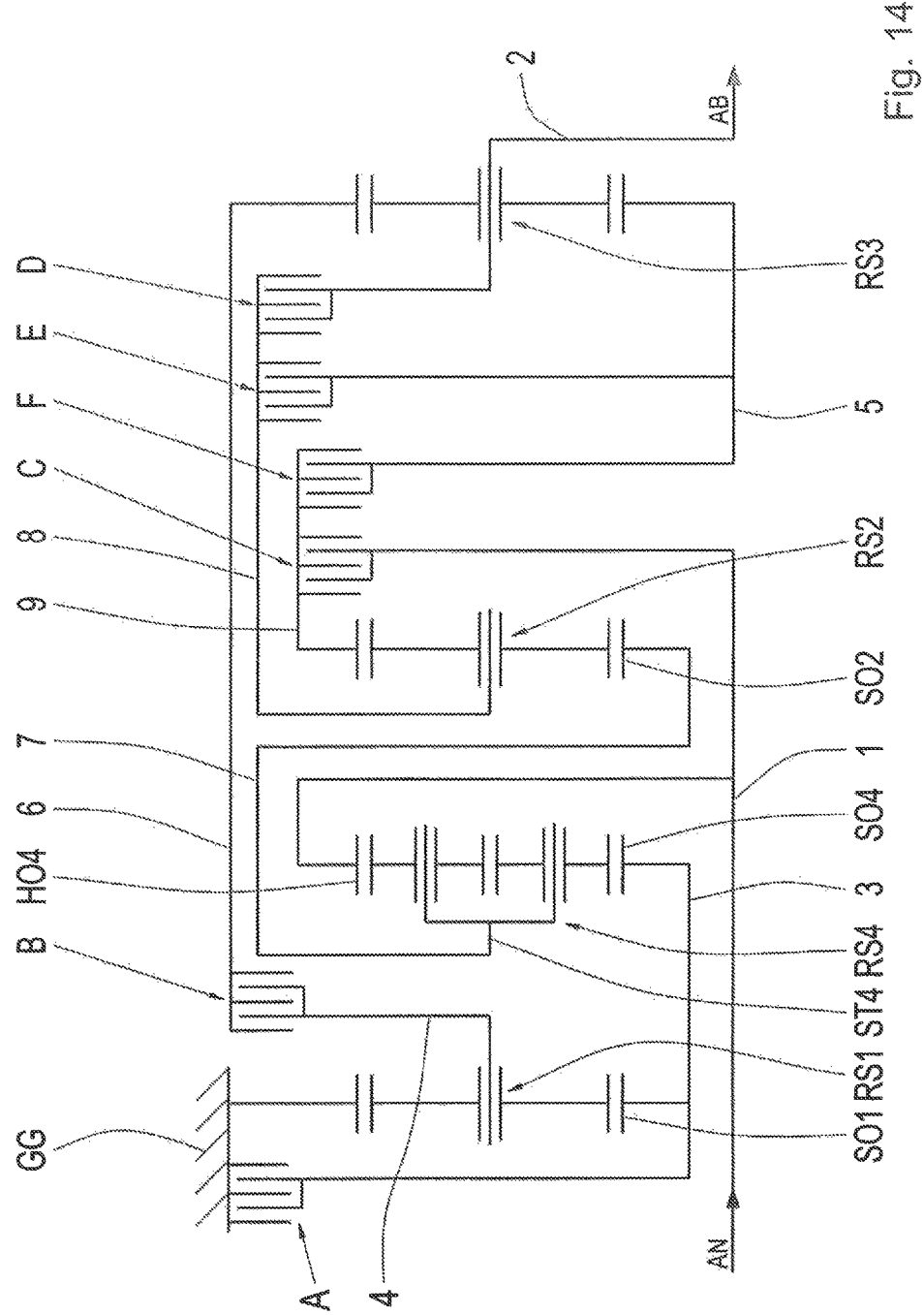
FIG. 14 provides a schematic presentation of a second exemplary alternative to the exemplary transmission in accordance with FIG. 3.

FIG. 14 shows a schematic presentation of a second exemplary alternative to the exemplary transmission diagram shown in FIG. 3. In contrast to the exemplary transmission diagram in accordance with FIG. 3, with which all four planetary gear sets are designed as negative planetary gear sets, in the exemplary transmission diagram in accordance with FIG. 14, the fourth planetary gear set RS4 is designed as a positive planetary gear set, while the other three planetary gear sets RS1, RS2, RS3 are designed as planetary gear sets, without any change. Viewed spatially, the sequence of the four individual planetary gear sets in FIG. 14, arranged coaxially adjacent to each other, is unchanged in respect of FIG. 3, and this is likewise the case for the spatial arrangement of all six shift elements A to F.

The structural adjustments caused by the transposition of the connection of the planetary gear carrier and ring gear of the positive planetary gear set in respect of the negative planetary gear set were already described on the basis of FIG. 8 and therefore do not require any repetition at this point, with the exception of the reference that the seventh shaft 7 in the exemplary transmission diagram in accordance with FIG. 14 acts as the second clutch shaft (and not as the third clutch shaft as in FIG. 8).

Figure 15:
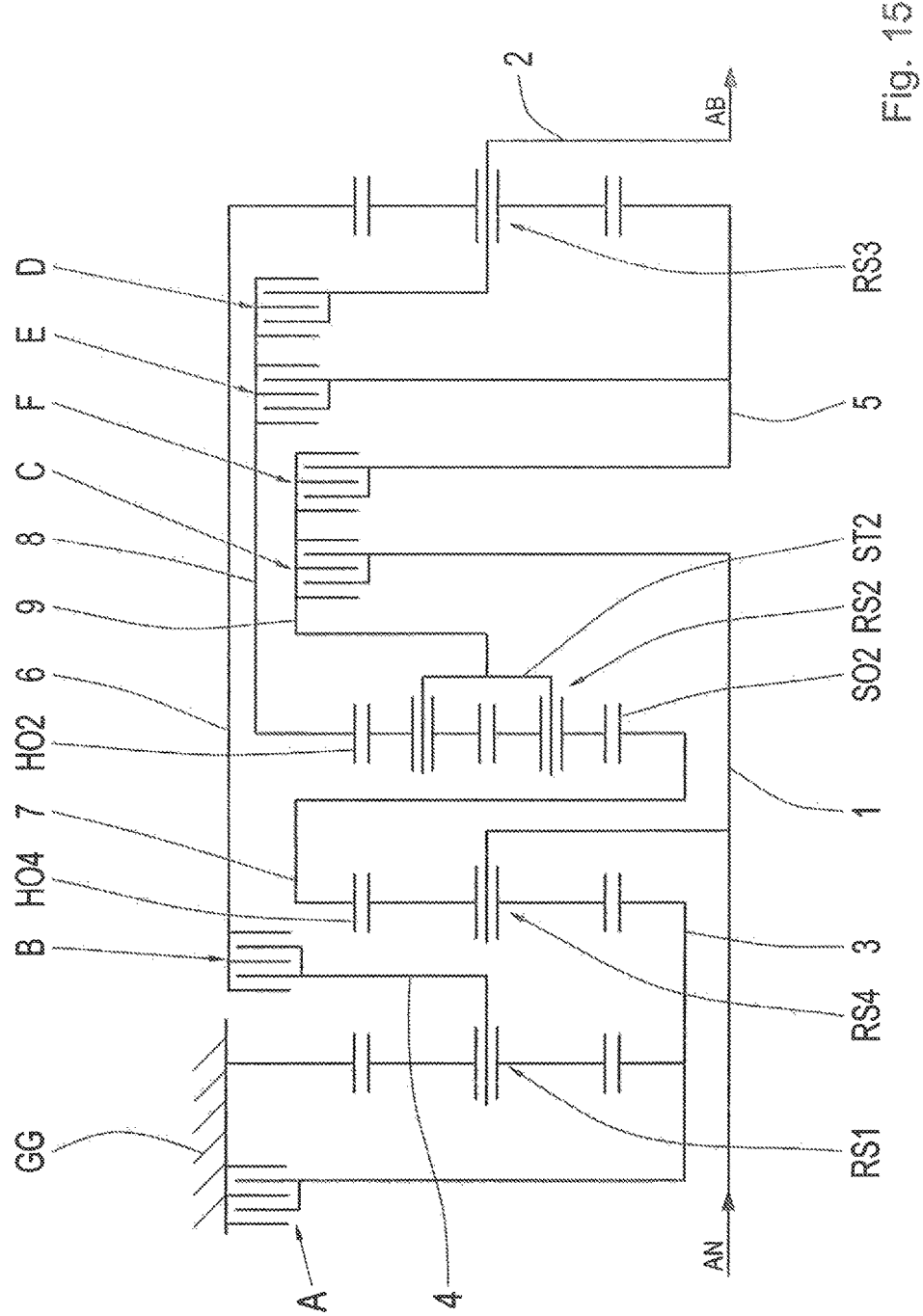
FIG. 15 provides a schematic presentation of a third exemplary alternative to the exemplary transmission in accordance with FIG. 3.

FIG. 15 shows a schematic presentation of a third exemplary alternative to the exemplary transmission diagram shown in FIG. 3. In contrast to the exemplary transmission diagram in accordance with FIG. 3, with which all four planetary gear sets are designed as negative planetary gear sets, in the exemplary transmission diagram in accordance with FIG. 15, the second planetary gear set RS2 is designed as a positive planetary gear set, while the other three planetary gear sets RS1, RS3, RS4 are designed as planetary gear sets, without any change. Viewed spatially, the sequence of the four individual planetary gear sets in FIG. 15, arranged coaxially adjacent to each other, is unchanged in respect of FIG. 3, and this is likewise the case for the spatial arrangement of all six shift elements A to F.

The structural adjustments caused by the transposition of the connection of the planetary gear carrier and ring gear of the positive planetary gear set in respect of the negative planetary gear set were already described on the basis of FIG. 9 and therefore do not require any repetition at this point, with the exception of the reference that the sixth shaft 6 in the exemplary transmission diagram in accordance with FIG. 15 does not act as the clutch shaft, and that the seventh shaft 7 in the exemplary transmission diagram in accordance with FIG. 15 acts as the second clutch shaft (and not as the third clutch shaft as in FIG. 9).

In knowledge of these three exemplary alternatives, described as examples, to the transmission diagram shown in FIG. 3, the specialist will easily generate alternatives with several positive planetary gear sets other than those listed in the table of FIG. 6. Thereby, in order to maintain the kinematics of the gear set system, only the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

Figure 16:
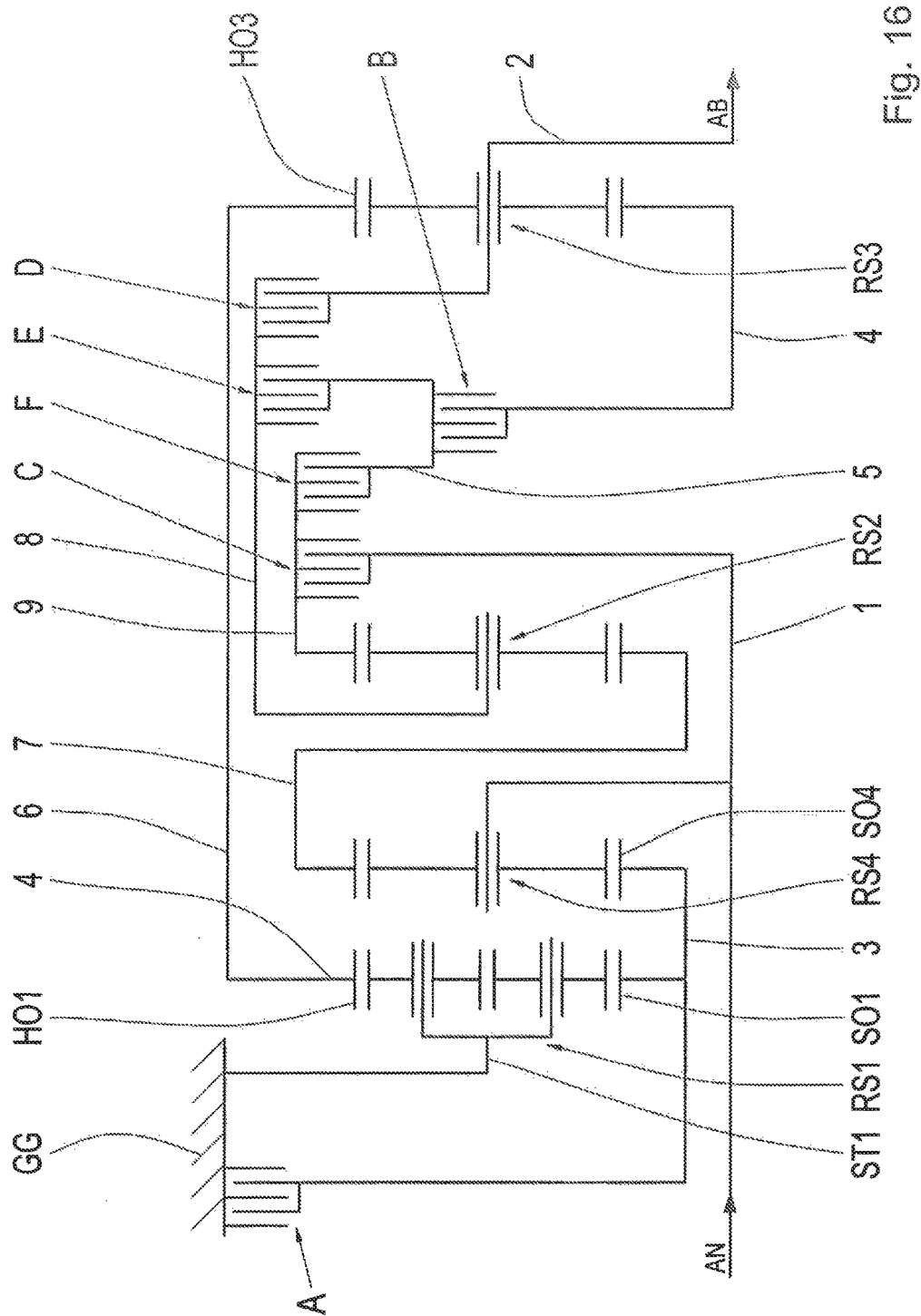
FIG. 16 provides a schematic presentation of a first exemplary alternative to the exemplary transmission in accordance with FIG. 4.

FIG. 16 shows a schematic presentation of a first exemplary alternative to the transmission diagram shown in FIG. 4. In contrast to the exemplary transmission diagram in accordance with FIG. 4, with which all four planetary gear sets are designed as negative planetary gear sets, in the exemplary transmission diagram in accordance with FIG. 16, the first planetary gear set RS1 is designed as a positive planetary gear set, while the other three planetary gear sets RS2, RS3, RS4 are designed as planetary gear sets, without any change. Viewed spatially, the sequence of the four individual planetary gear sets in FIG. 16, arranged coaxially adjacent to each other, is unchanged in respect of FIG. 4, and this is likewise the case for the spatial arrangement of all six shift elements A to F, such that, in order to avoid repetitions, only the major differences from FIG. 4 need further clarification in the description of FIG. 16.

In order to maintain the kinematics of the exemplary gear set system in accordance with FIG. 4, the following is provided in FIG. 16: without any change, the sun gear SO1 forms the first element of the first planetary gear set RS1, which is constantly and directly connected to both the sun gear SO4 of the fourth planetary gear set RS4 and the brake A through the third shaft 3 of the automatic transmission (which acts as the first clutch shaft), thus can be fixed to the transmission GG through this brake A (together with the sun gear SO4). The ring gear HO1 mow forms the second element of the first planetary gear set RS1, which is constantly and directly connected to the third element (ring gear HO3) of the third planetary gear set RS3 through the sixth shaft 6 of the automatic transmission (which acts as the second clutch shaft). The planetary gear carrier ST1 now forms the third element of the first planetary gear set RS1, which is constantly fixed to the housing GG.

Figure 17:
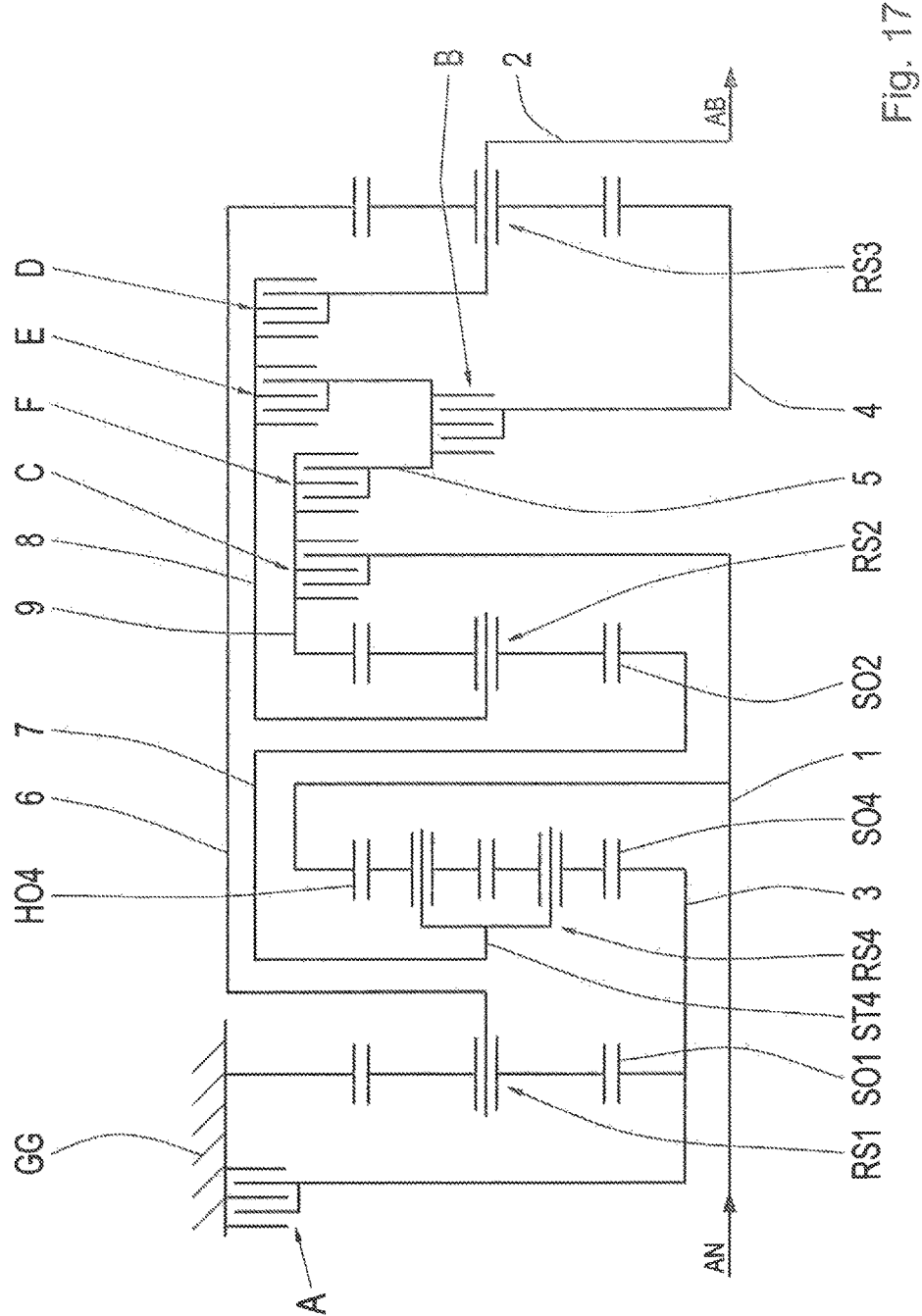
FIG. 17 provides a schematic presentation of a second exemplary alternative to the exemplary transmission in accordance with FIG. 4.

FIG. 17 shows a schematic presentation of a second exemplary alternative to the transmission diagram shown in FIG. 4. In contrast to the exemplary transmission diagram in accordance with FIG. 4, with which all four planetary gear sets are designed as negative planetary gear sets, in the exemplary transmission diagram in accordance with FIG. 17, the fourth planetary gear set RS4 is designed as a positive planetary gear set, while the other three planetary gear sets RS1, RS2, RS3 are designed as planetary gear sets, without any change. Viewed spatially, the sequence of the four individual planetary gear sets in FIG. 17, arranged coaxially adjacent to each other, is unchanged in respect of FIG. 4, and this is likewise the case for the spatial arrangement of all six shift elements A to F.

The structural adjustments caused by the transposition of the connection of the planetary gear carrier and ring gear of the positive planetary gear set in respect of the negative planetary gear set were already described on the basis of FIG. 8 and therefore do not require any repetition at this point.

Figure 18:
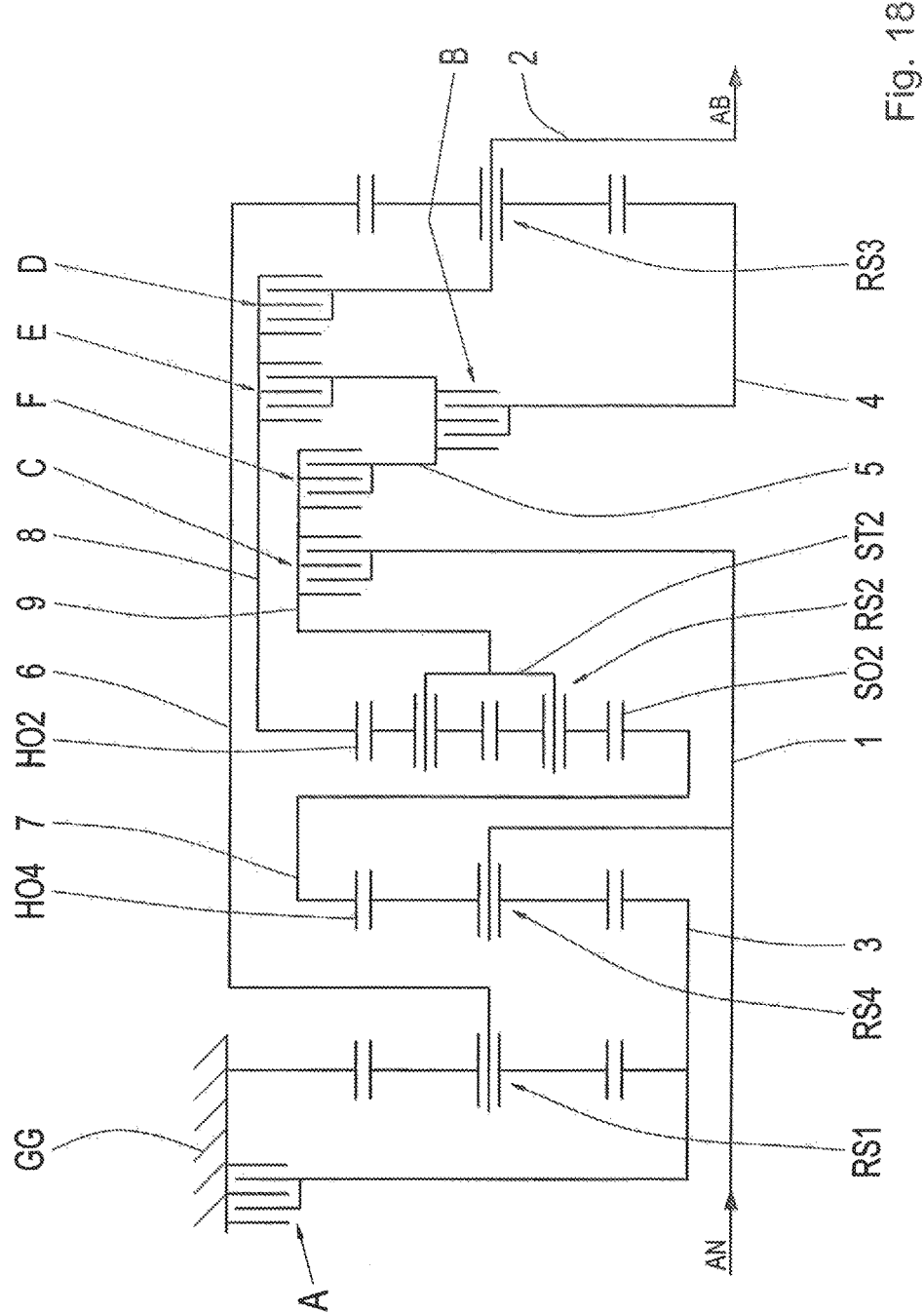
FIG. 18 provides a schematic presentation of a third exemplary alternative to the exemplary transmission in accordance with FIG. 4.

FIG. 18 shows a schematic presentation of a third exemplary alternative to the exemplary transmission diagram shown in FIG. 4. In contrast to the exemplary transmission diagram in accordance with FIG. 4, with which all four planetary gear sets are designed as negative planetary gear sets, in the exemplary transmission diagram in accordance with FIG. 18, the second planetary gear set RS2 is designed as a positive planetary gear set, while the other three planetary gear sets RS1, RS3, RS4 are designed as planetary gear sets, without any change. Viewed spatially, the sequence of the four individual planetary gear sets in FIG. 18, arranged coaxially adjacent to each other, is unchanged in respect of FIG. 4, and this is likewise the case for the spatial arrangement of all six shift elements A to F, such that, in order to avoid repetitions, only the major differences from FIG. 4 need further clarification in the description of FIG. 18.

In order to maintain the kinematics of the exemplary gear set system in accordance with FIG. 4, the following is provided in FIG. 18: without any change, the sun gear SO2 forms the first element of the second planetary gear set RS2, which is constantly connected to the third element (ring gear HO4) of the fourth planetary gear set RS4 through the seventh shaft 7 of the automatic transmission (which acts as the third clutch shaft). The ring gear HO2 now forms the second element of the second planetary gear RS2, which, as the eighth shaft 8 of the automatic transmission, is constantly connected to the two clutches D and E. The planetary gear carrier ST2 now forms the third element of the second planetary gear set RS2, which, as the ninth shaft 9 of the automatic transmission, is constantly connected to the two clutches C and F. If the second planetary gear set RS2 is blocked, such that all three elements of the planetary gear set RS2 rotate with the same rotational speed, the clutches E and F, which are arranged in a row one behind the other in the direction of the power flow, must be engaged at the same time, by which the ring gear HO2 and the planetary gear carrier ST2 of the second planetary gear set RS2 are then connected to each other.

In knowledge of these three exemplary alternatives, described as examples, to the transmission diagram shown in FIG. 1, the specialist will easily generate alternatives with several positive planetary gear sets other than those listed in the table of FIG. 6. Thereby, in order to maintain the kinematics of the gear set system, only the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

As also shown in the automatic transmission presented in FIGS. 1 to 4, all of the automatic transmissions presented in FIGS. 7 to 18 can shift ten forward gears and one reverse gear under the use of the shifting logic indicated in FIG. 5.

Further developments are described below; they feature eleven forward gears, building on the 10-speed automatic transmission in accordance with aspects of the invention described above.

Figure 19:
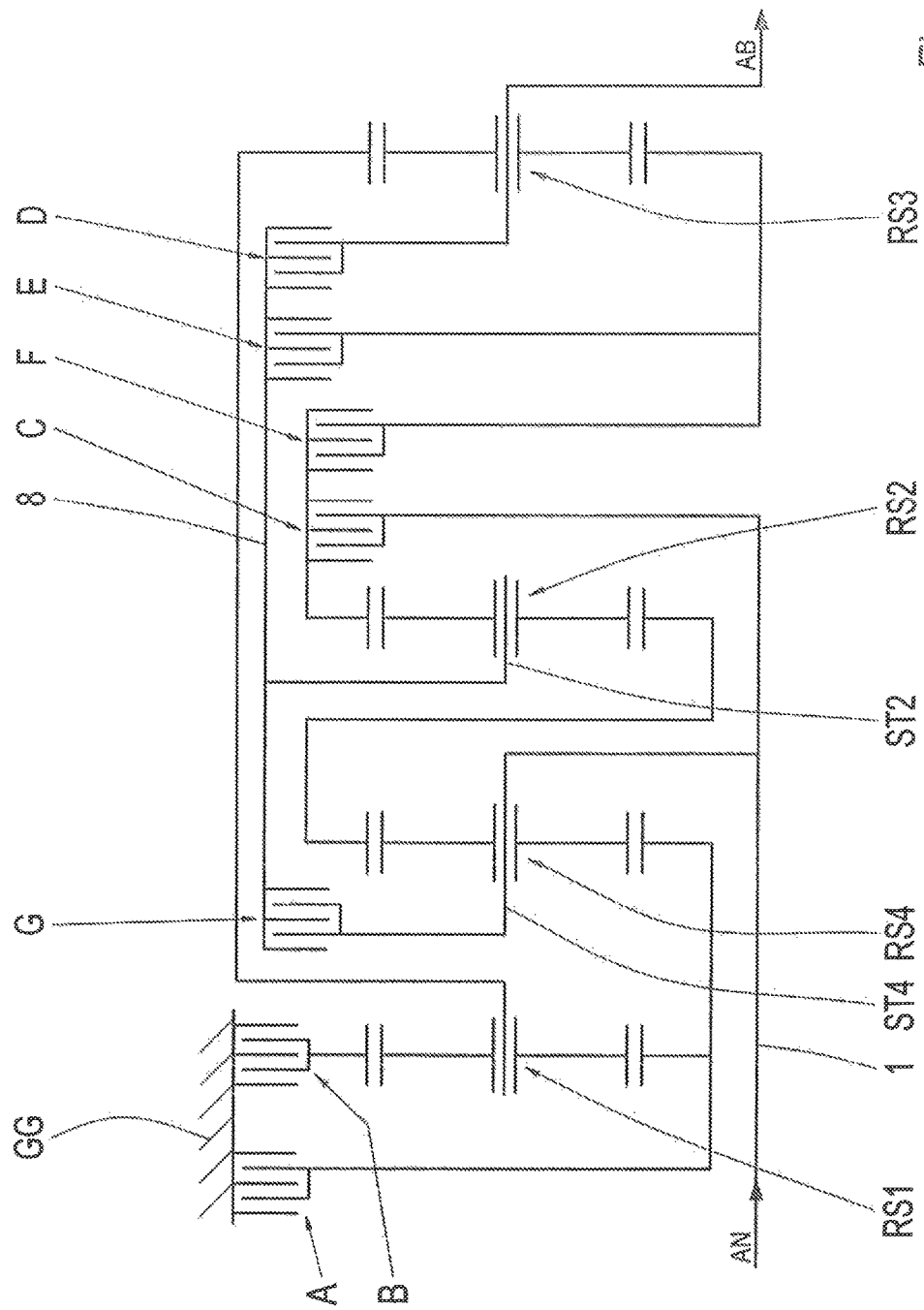
FIG. 19 provides a schematic presentation of a first exemplary embodiment of an 11-speed automatic transmission in accordance with aspects of the invention, derived from the exemplary transmission in accordance with FIG. 1.

FIG. 19 shows the gear set diagram of a first exemplary embodiment of an 11-speed automatic transmission in accordance with aspects of the invention. The gear set diagram shown here is a further development of the 10-speed automatic transmission shown in FIG. 1. With the goal of an additional forward gear, without having to significantly change the transmission structure indicated in FIG. 1 and significantly increasing the necessary installation lengths of the transmission, based on the transmission diagrams shown in FIG. 1, with the exemplary transmission in accordance with FIG. 19, an additional seventh shift element G is provided, which is formed as a clutch and is arranged in the power flow between the first shaft 1 (drive shaft AN) and the eighth shaft 8 of the automatic transmission. Thereby, an additional forward gear below the first gear of the 10-speed transmission known from FIG. 5 is achieved; thus, an additional starting gear with a transmission ratio greater than the transmission ratio of the first gear known from FIG. 5.

As shown in FIG. 1, with the exemplary embodiment presented in FIG. 19, all four planetary gear sets RS1, RS2, RS3, RS4 are formed as simple negative planetary gear sets, each of which features a first, a second and a third element, thus a sun gear, a planetary gear carrier and a ring gear. Thereby, all of the first elements are formed as sun gears, all of the second elements are formed as planetary gear carriers and all of the third elements are formed as ring gears. The spatial arrangement of the four planetary gear sets RS1, RS2, RS3, RS4, coaxially next to each other with the defined order of "first, fourth, second, third planetary gear set" (thus the arrangement of "RS1-RS4 RS2-RS3"), is taken from FIG. 1 without any change. The spatial arrangement of the six shift elements A to F is also taken from FIG. 1.

As also shown in FIG. 19, the clutch 9 arranged in the power flow between the shaft 1 (drive shaft AN) and the shaft 8 is, viewed spatially, arranged in an area axially between the first planetary gear set RS1 and the fourth planetary gear set RS4. This allows for the arrangement of the multi-disk pack of the clutch G, which—as will be described later, is engaged only in the first forward gear and thus must transfer a comparatively large torque—has a comparatively large diameter, similar to the diameter of the two ring gears HO1 and HO4. Accordingly, the section of the eighth shaft 8, which is connected (here, by way of example) to the outer multi-disk carrier of the clutch G, completely overlaps the eighth shaft 8 of the fourth planetary gear set RS4, by which the planetary gear set RS4 and the clutch G are arranged inside a cylindrical space, which is formed by such section of the shaft 8. In a structurally simple manner, the feed of means of pressure and lubricant to the clutch G can be realized with minimum leakage loss through the drive shaft AN and the planetary gear carrier ST4 of the fourth planetary gear set RS4, which is constantly connected to the drive shaft AN.

The spatial arrangement of the clutch G presented here has an exemplary nature; of course, the specialist can also otherwise spatially position the clutch G. For example, the clutch G can also be arranged, viewed spatially, in an area axially between the second planetary gear set RS2 and the fourth planetary gear set RS4. If, by way of derogation from FIG. 19, the clutch G is designed in the model of a claw coupling, it is expedient to arrange such claw coupling on a small diameter in the area axially between the sun gears SO2 and SO4.

This expansion, described with reference to FIG. 19, of the exemplary transmission diagram in accordance with FIG. 1 by an additional seventh shift element G can also be transferred to the transmission kinematics in accordance with FIG. 2, the transmission kinematics in accordance with FIG. 3 and the transmission kinematics in accordance with FIG. 4, which is shown below with reference to FIGS. 20 to 22. The considerations regarding the spatial arrangement of the additional clutch G, described with reference to FIG. 19, are also applicable to the transmission presented in FIGS. 20 to 22.

Figure 20:
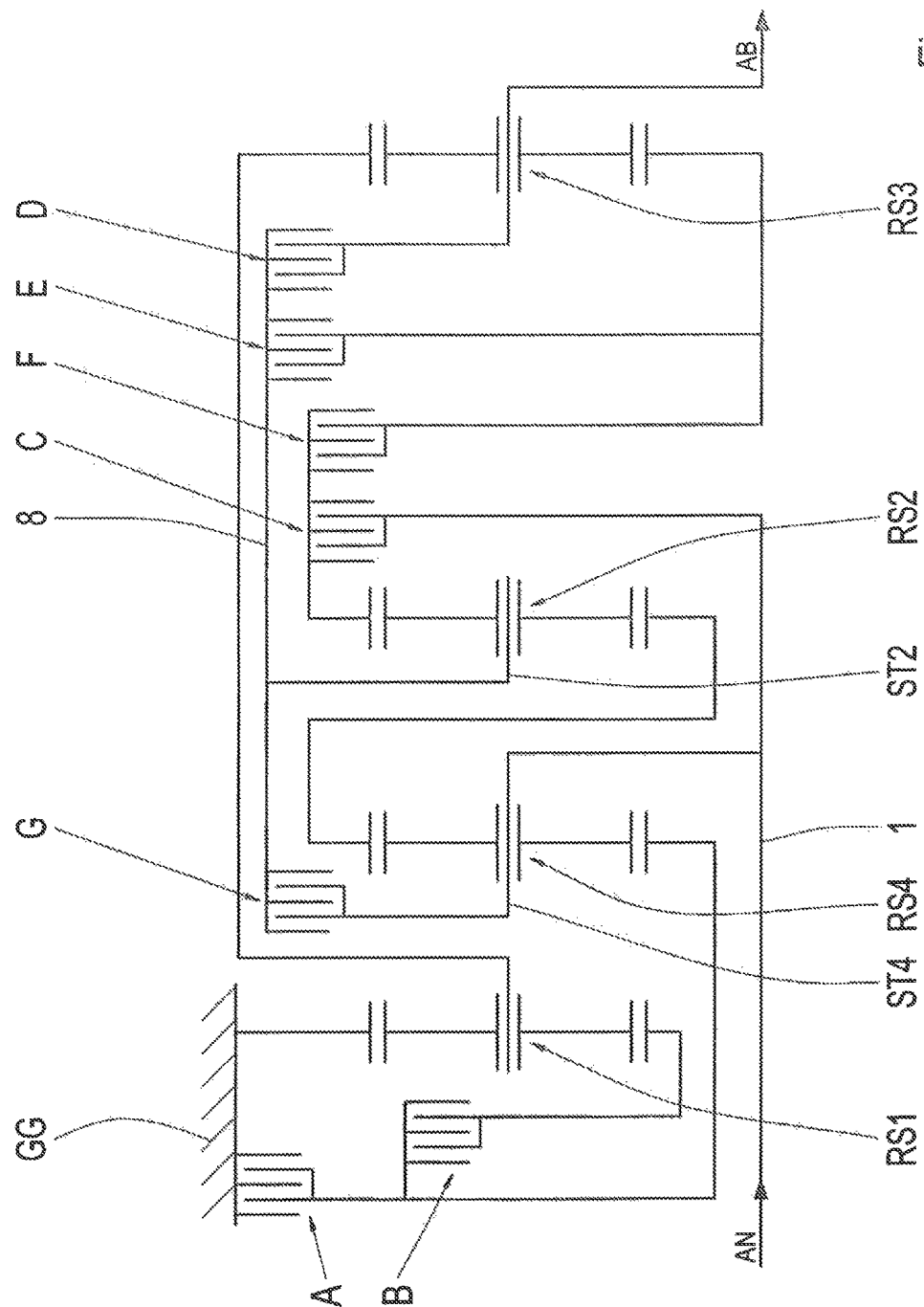
FIG. 20 provides a schematic presentation of a second exemplary embodiment of an 11-speed automatic transmission in accordance with aspects of the invention, derived from the exemplary transmission in accordance with FIG. 2.

FIG. 20 shows the gear set diagram of a second exemplary embodiment of an 11-speed automatic transmission in accordance with aspects of the invention. The gear set diagram presented here is a further development of the 10-speed automatic transmission presented in FIG. 2. As shown in FIG. 19, an additional seventh shift element G is provided; this is formed as a clutch and is arranged in the power flow between the first shaft 1 (drive shaft AN) and the eighth shaft 8 of the automatic transmission.

Figure 21:
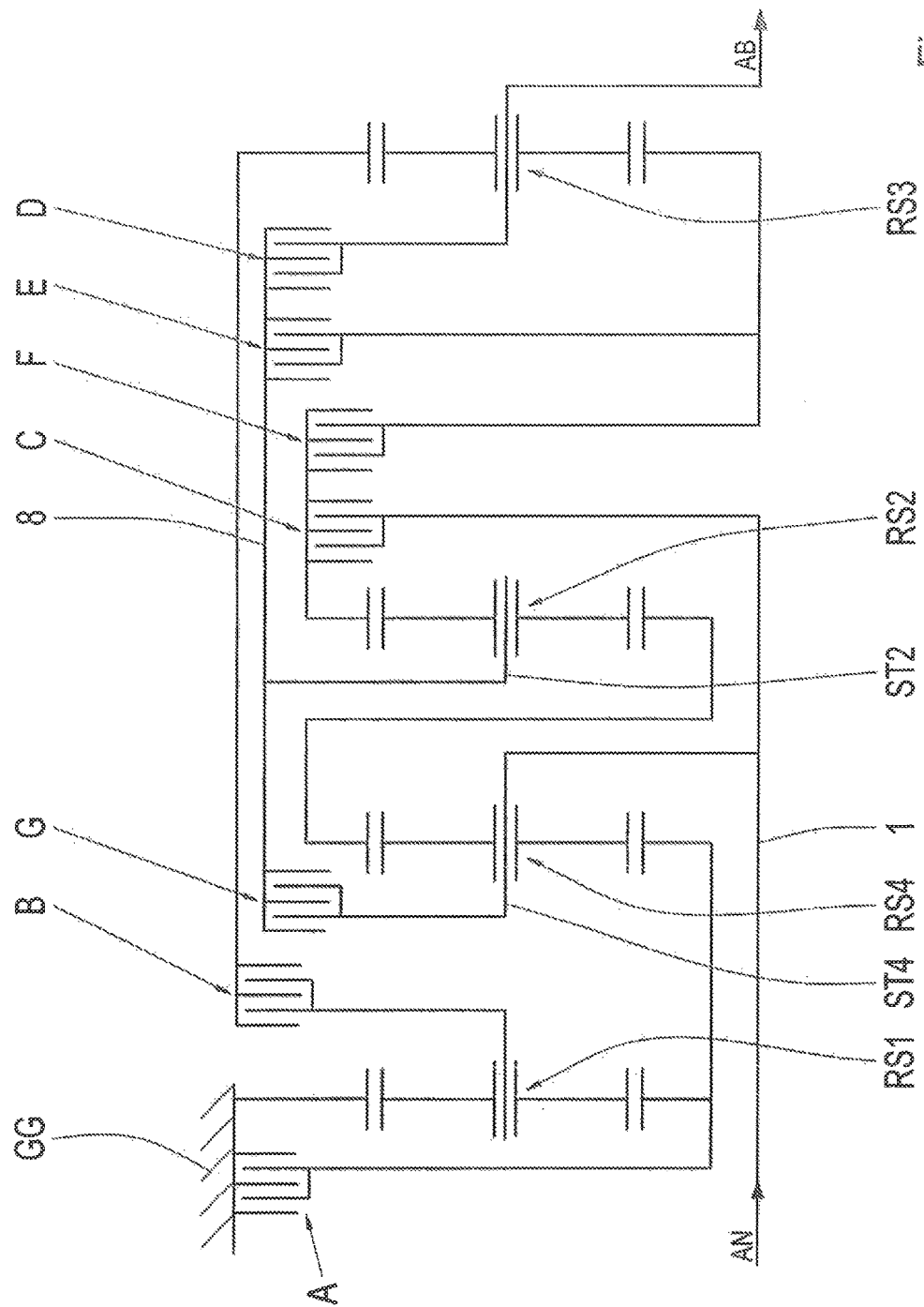
FIG. 21 provides a schematic presentation of a third exemplary embodiment of an 11-speed automatic transmission in accordance with aspects of the invention, derived from the exemplary transmission in accordance with FIG. 3.

FIG. 21 presents the gear set diagram of a third exemplary embodiment of an 11-speed automatic transmission in accordance with aspects of the invention. The gear set diagram presented here is a further development of the 10-speed automatic transmission presented in FIG. 3. As shown in FIG. 19, an additional seventh shift element G is provided; this is formed as a clutch and is arranged in the power flow between the first shaft 1 (drive shaft AN) and the eighth shaft 8 of the automatic transmission.

Figure 22:
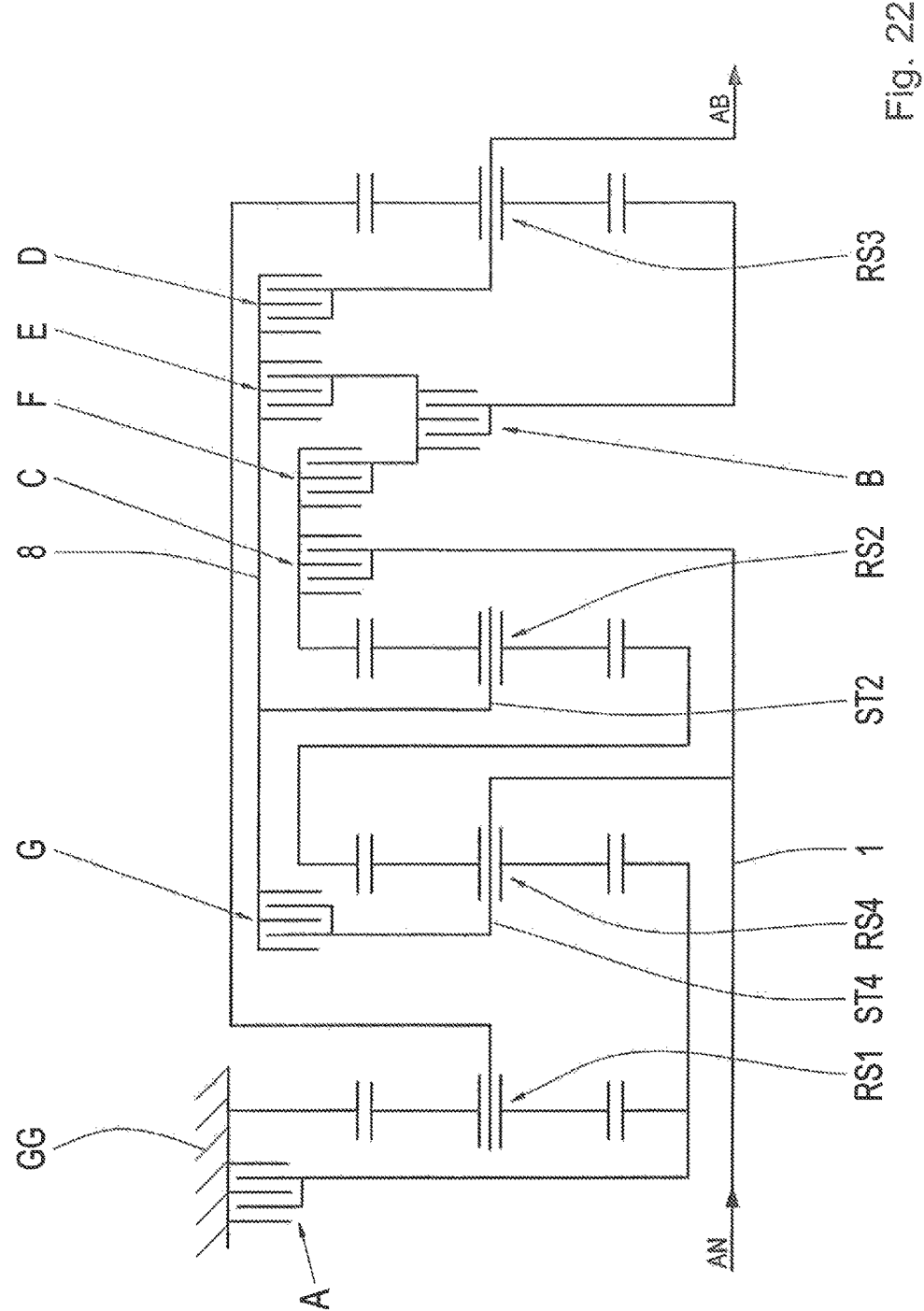
FIG. 22 provides a schematic presentation of a fourth exemplary embodiment of an 11-speed automatic transmission in accordance with aspects of the invention, derived from the exemplary transmission in accordance with FIG. 4.

FIG. 22 presents the gear set diagram of a third exemplary embodiment of a 10-speed automatic transmission in accordance with aspects of the invention. The gear set diagram presented here is a further development of the 10-speed automatic transmission presented in FIG. 3. As shown in FIG. 19, an additional seventh shift element G is provided; this is formed as a clutch and is arranged in the power flow between the first shaft 1 (drive shaft AN) and the eighth shaft 8 of the automatic transmission.

FIG. 23 presents an exemplary shifting diagram of the 11-speed automatic transmission in accordance with aspects of the invention in accordance with FIGS. 19 to 22. In each gear, four shift elements are engaged and three shift elements are open. Furthermore, it can be seen from the shifting diagram that, upon a sequential shifting operation, double gearshifts or group gearshifts, as the case may be, may be avoided, since two gears adjacent in the shifting logic always jointly use two shift elements. The first forward gear is particularly well-suited as a so-called "crawler," with a smaller overall transmission ratio for a large pulling force. The ninth forward gear is formed as a direct gear, such that two forward gears of an overdrive nature are available.

The exemplary embodiments presented in FIGS. 19 to 22, with which all four planetary gear sets RS1, RS2, RS3, RS4 are formed as simple negative planetary gear sets are to be understood as examples. Without changing the kinematics of the gear set system, individual or several negative planetary gear sets can be replaced by positive planetary gear sets. FIG. 24 shows a table with such variations of the planetary gear set models that lead to a technically sensible transmission assembly. Below, two examples of these are described in detail. All of the variants listed in the table can shift eleven forward gears and one reverse gear through the shifting logic presented in FIG. 23.

Figure 25:
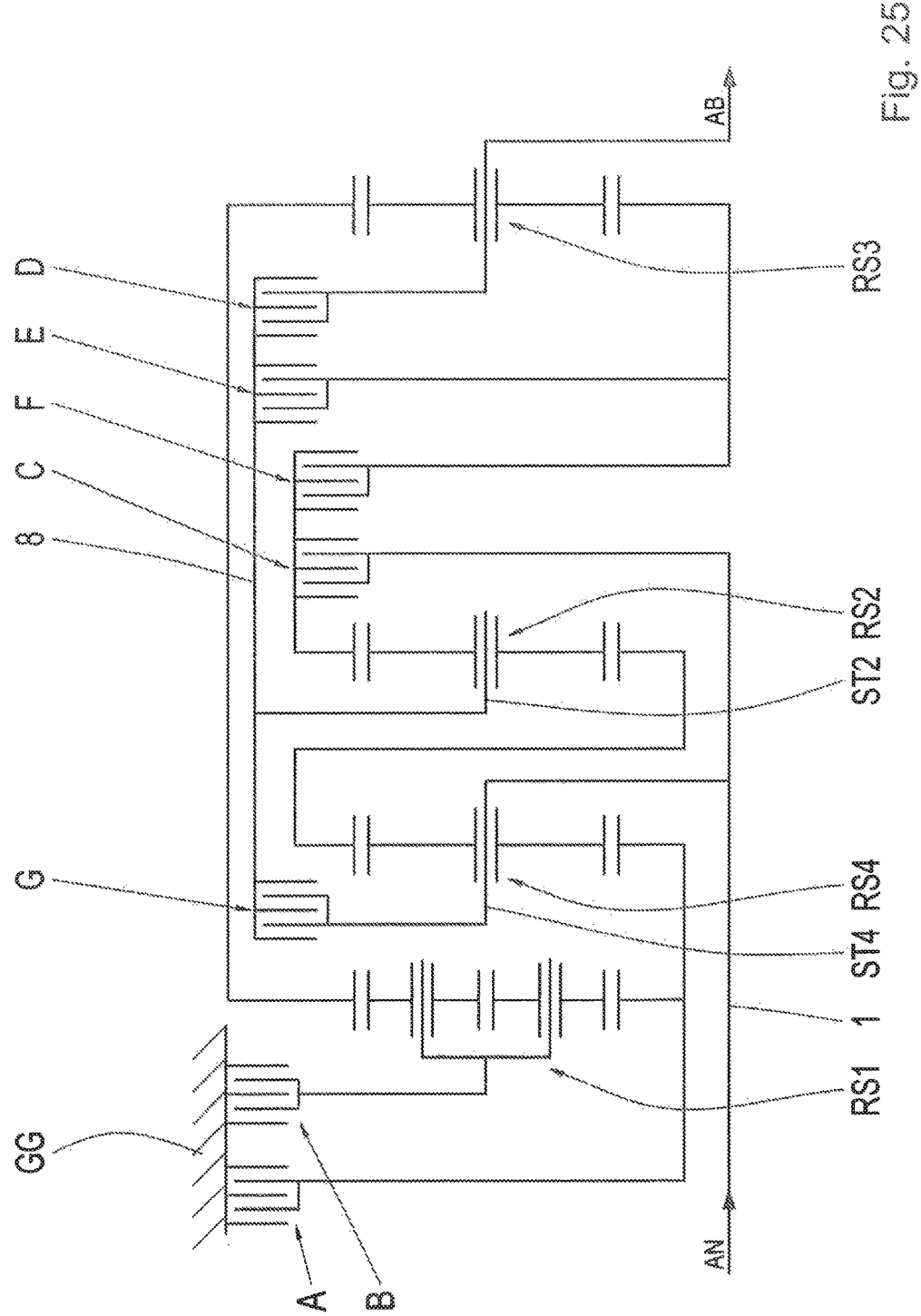
FIG. 25 provides a schematic presentation of a first exemplary alternative to the exemplary transmission in accordance with FIG. 19.

FIG. 25 shows a schematic presentation of a first exemplary alternative to the transmission diagram shown in FIG. 19. In contrast to the exemplary transmission diagram in accordance with FIG. 19, with which all four planetary gear sets are designed as negative planetary gear sets, in the exemplary transmission diagram in accordance with FIG. 19, the first planetary gear set RS1 is designed as a positive planetary gear set, while the other three planetary gear sets RS2, RS3 and RS4 are designed as planetary gear sets, without any change. Viewed spatially, the sequence of the four individual planetary gear sets in FIG. 25, arranged coaxially adjacent to each other, is unchanged in respect of FIG. 19, and this is likewise the case for the spatial arrangement of all seven shift elements A to G. In this connection, reference is also made to the 10-speed automatic transmission shown in FIG. 7, with which the first planetary gear set RS1 is formed as a positive planetary gear set, while the other three planetary gear sets RS2, RS3 and RS4 are formed as negative planetary gear sets. It is readily apparent that the 11-speed automatic transmission shown in FIG. 25 differs from the exemplary transmission in accordance with FIG. 7 only by the additional seventh shift element G, which—as shown in FIG. 25—is arranged in the power flow between the first shaft 1 (drive shaft AN) and the eighth shaft 8 of the automatic transmission. Thus, a further detailed explanation of FIG. 25 is not necessary.

Figure 26:
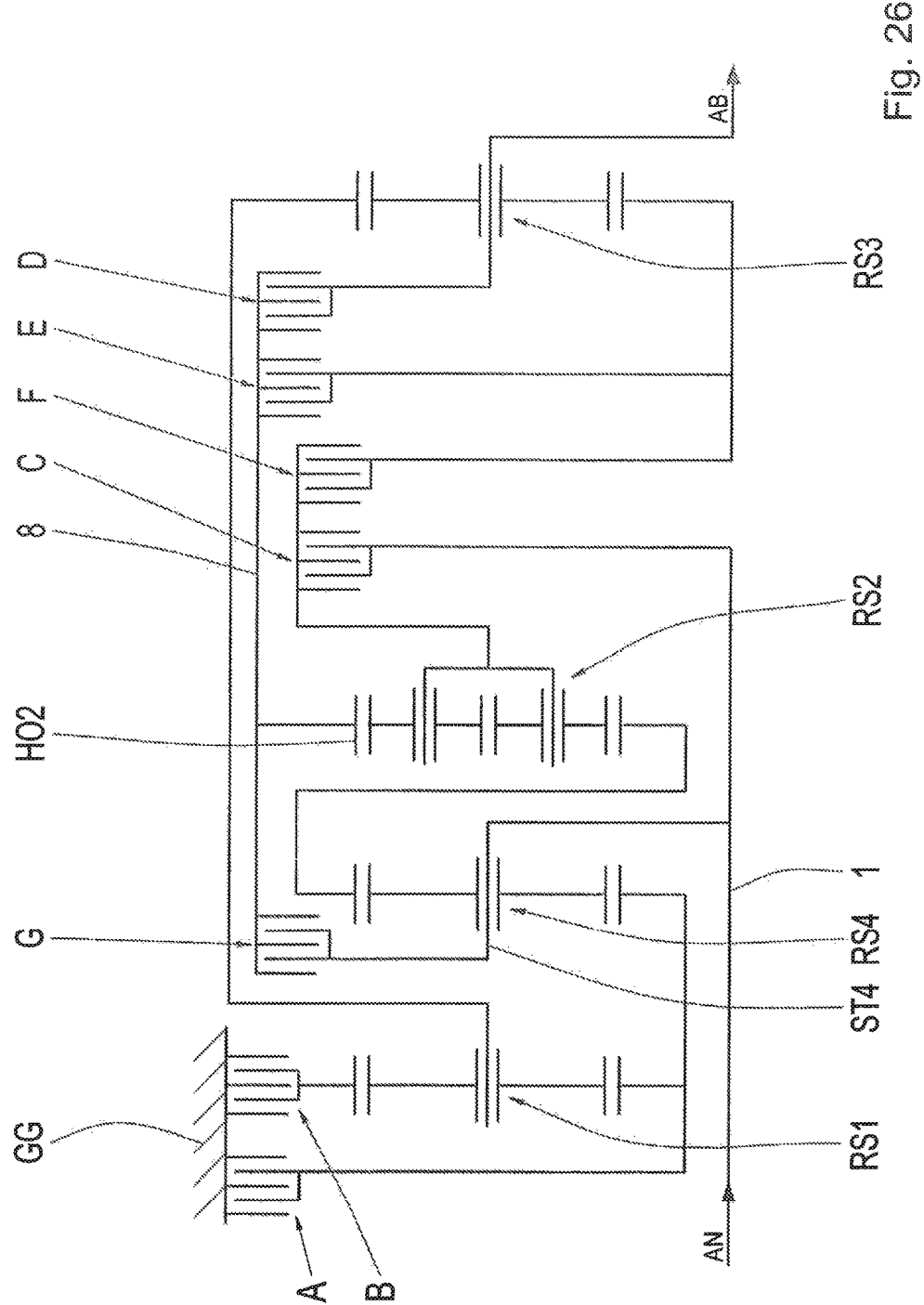
FIG. 26 provides a schematic presentation of a second exemplary alternative to the exemplary transmission in accordance with FIG. 19.
Figure 30:
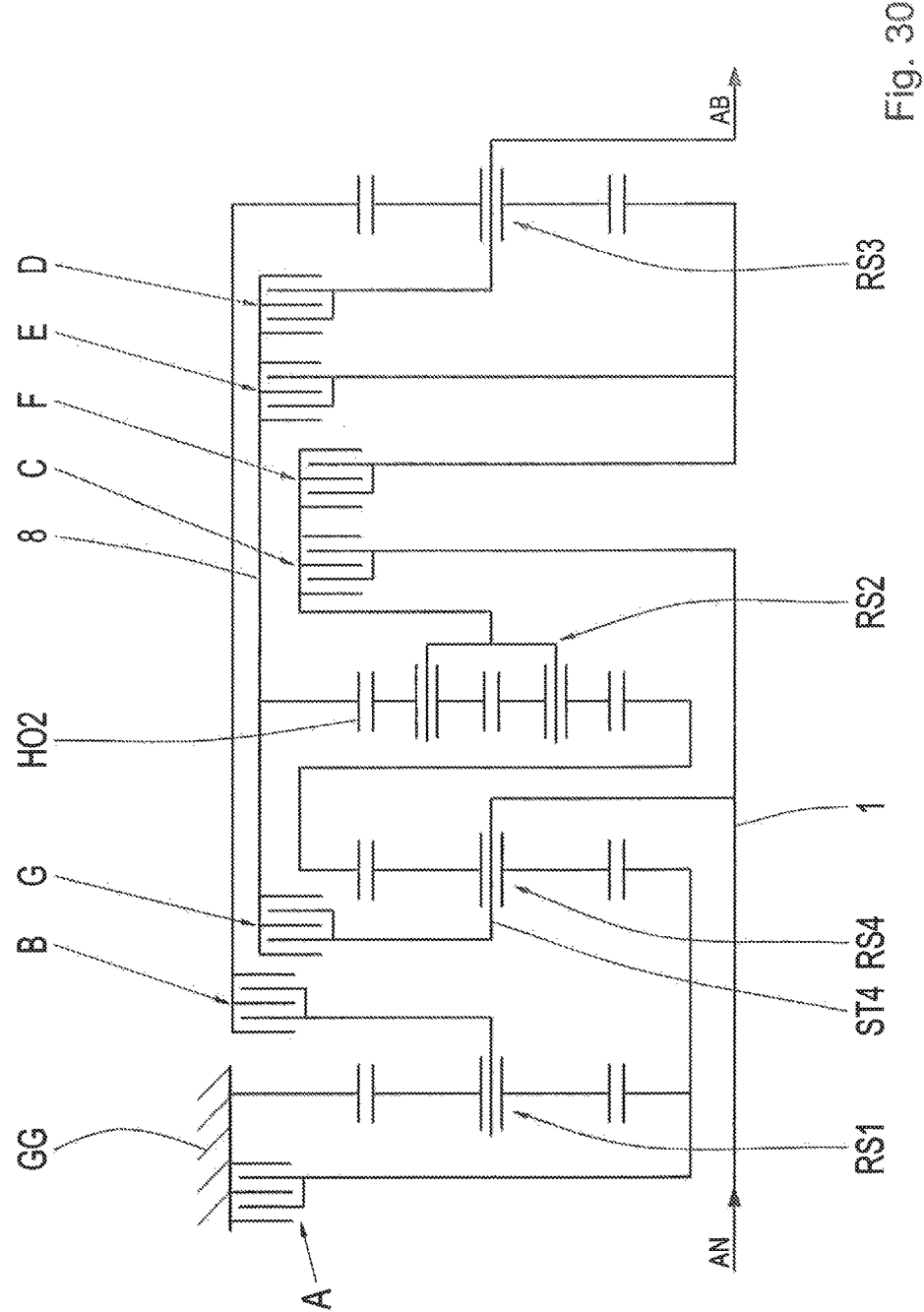
FIG. 30 provides a schematic presentation of a second exemplary alternative to the exemplary transmission in accordance with FIG. 21.

FIG. 26 shows a schematic presentation of a second exemplary alternative to the transmission diagram shown in FIG. 19. In contrast to the exemplary transmission diagram in accordance with FIG. 19, with which all four planetary gear sets are designed as negative planetary gear sets, in the exemplary transmission diagram in accordance with FIG. 26, the second planetary gear set RS2 is designed as a positive planetary gear set, while the other three planetary gear sets RS1, RS3, RS4 are designed as planetary gear sets, without any change. Viewed spatially, the sequence of the four individual planetary gear sets in FIG. 26, arranged coaxially adjacent to each other, is unchanged in respect of FIG. 19, and this is likewise the case for the spatial arrangement of all seven shift elements A to G. In this connection, reference is also made to the 10-speed automatic transmission shown in FIG. 9, with which the first planetary gear set RS1 is formed as a positive planetary gear set, while the other three planetary gear sets RS2, RS3 and RS4 are formed as negative planetary gear sets. It is readily apparent that the exemplary 11-speed automatic transmission shown in FIG. 26 differs from the exemplary transmission in accordance with FIG. 9 only by the additional seventh shift element G, which—as shown in FIG. 19—is arranged in the power flow between the first shaft 1 (drive shaft AN) and the eighth shaft 8 of the automatic transmission. Thus, a further detailed explanation of FIG. 30 is not necessary.

In knowledge of these two exemplary alternatives, described as examples, to the transmission diagram shown in FIG. 19, the specialist will easily generate alternatives with several positive planetary gear sets other than those listed in the table of FIG. 24. Thereby, in order to maintain the kinematics of the gear set system, only the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

Figure 27:
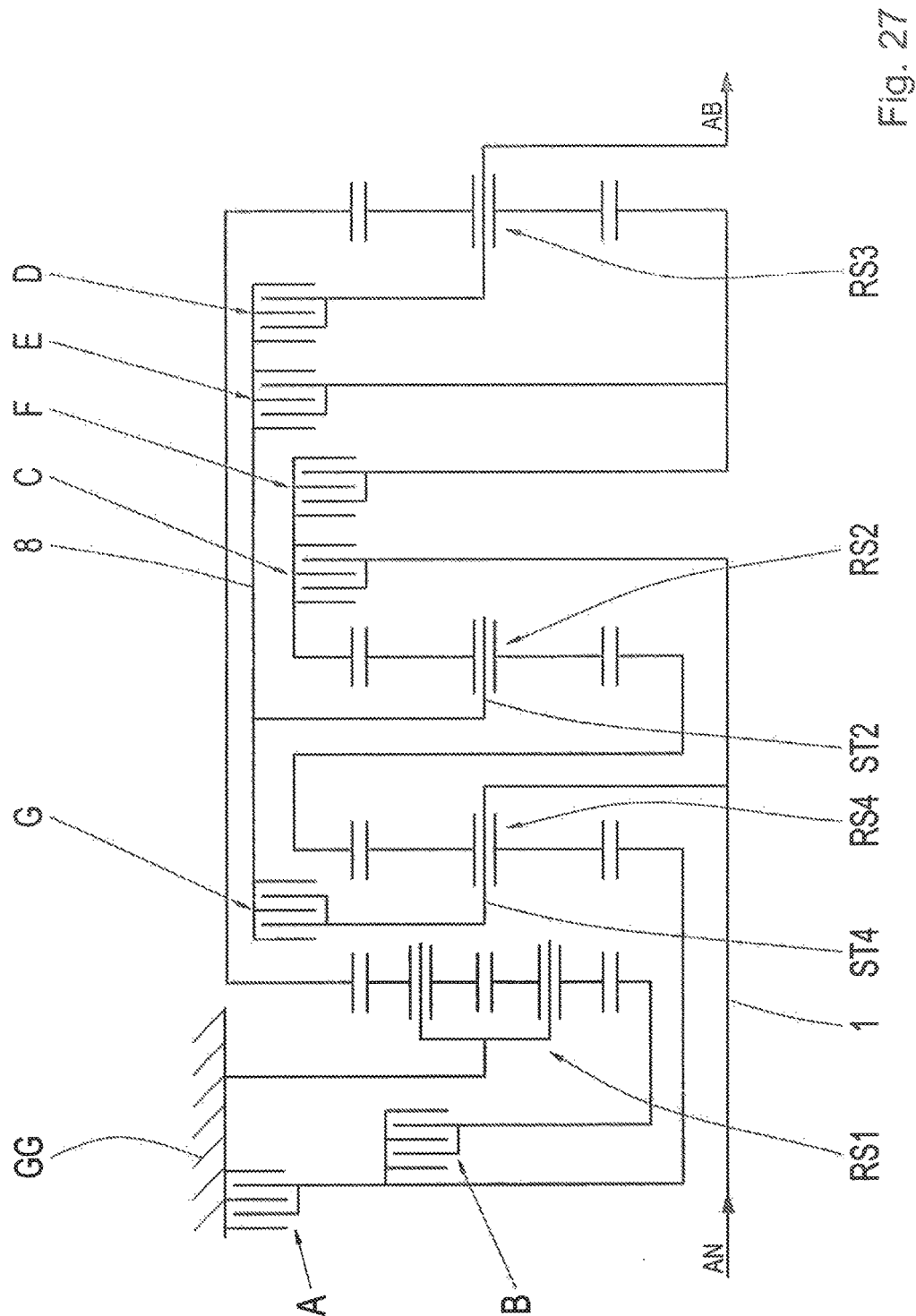
FIG. 27 provides a schematic presentation of a first exemplary alternative to the exemplary transmission in accordance with FIG. 20.

FIG. 27 shows a schematic presentation of a first exemplary alternative to the exemplary transmission diagram shown in FIG. 20. In contrast to the exemplary transmission diagram in accordance with FIG. 20, with which all four planetary gear sets are designed as negative planetary gear sets, in the exemplary transmission diagram in accordance with FIG. 27, the first planetary gear set RS1 is designed as a positive planetary gear set, while the other three planetary gear sets RS2, RS3 and RS4 are designed as planetary gear sets, without any change. Viewed spatially, the sequence of the four individual planetary gear sets in FIG. 27, arranged coaxially adjacent to each other, is unchanged in respect of FIG. 20, and this is likewise the case for the spatial arrangement of all seven shift elements A to G. In this connection, reference is also made to the 10-speed automatic transmission shown in FIG. 10, with which the first planetary gear set RS1 is formed as a positive planetary gear set, while the other three planetary gear sets RS2, RS3 and RS4 are formed as negative planetary gear sets. It is readily apparent that the 11-speed automatic transmission shown in FIG. 27 differs from the exemplary transmission in accordance with FIG. 10 only by the additional seventh shift element G, which—as shown in FIG. 20—is arranged in the power flow between the first shaft 1 (drive shaft AN) and the eighth shaft 8 of the automatic transmission. Thus, a further detailed explanation of FIG. 27 is not necessary.

Figure 28:
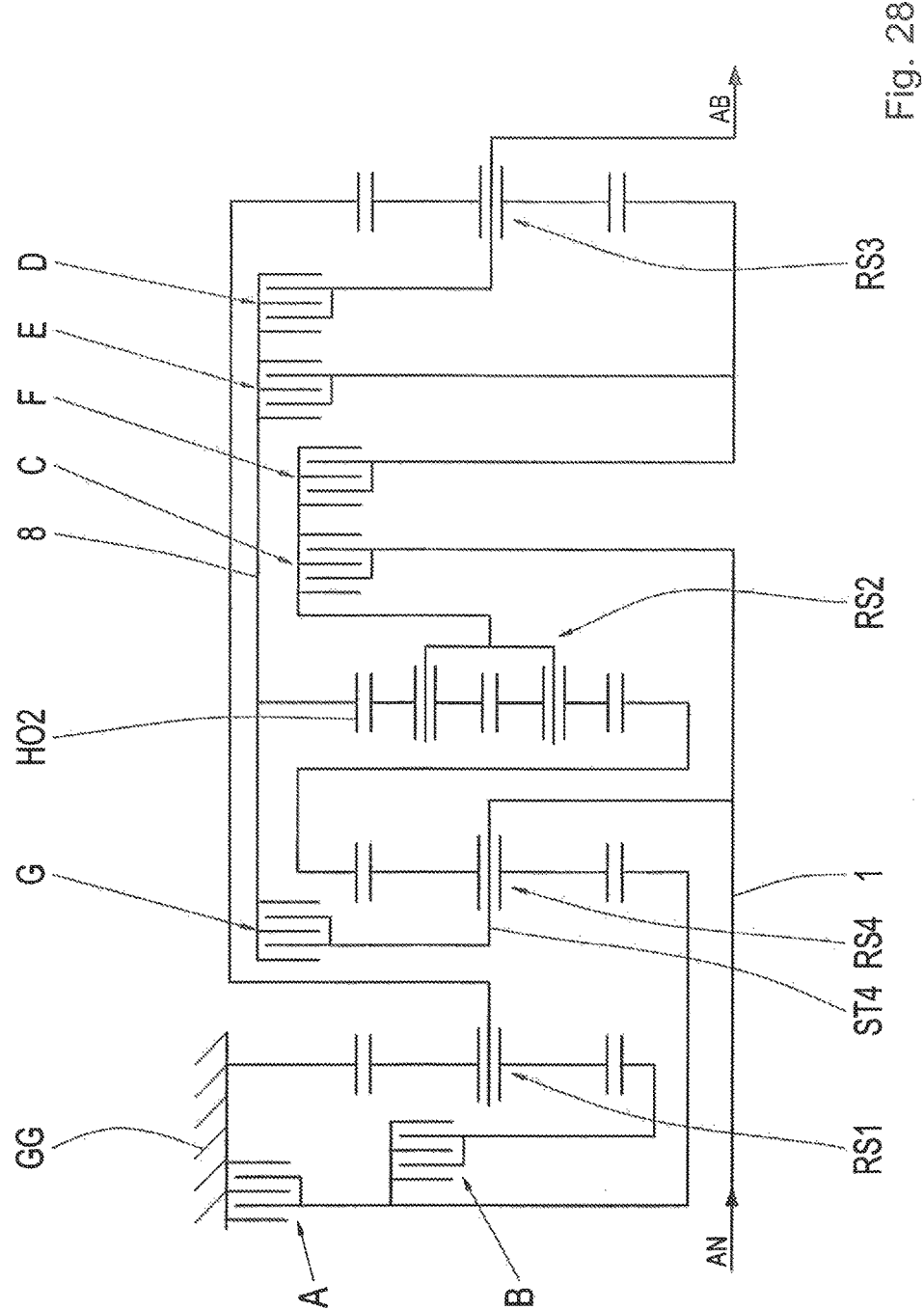
FIG. 28 provides a schematic presentation of a second exemplary alternative to the exemplary transmission in accordance with FIG. 20.

FIG. 28 shows a schematic presentation of a second exemplary alternative to the exemplary transmission diagram shown in FIG. 20. In contrast to the exemplary transmission diagram in accordance with FIG. 20, with which all four planetary gear sets are designed as negative planetary gear sets, in the exemplary transmission diagram in accordance with FIG. 28, the second planetary gear set RS2 is designed as a positive planetary gear set, while the other three planetary gear sets RS1, RS3, RS4 are designed as planetary gear sets, without any change. Viewed spatially, the sequence of the four individual planetary gear sets in FIG. 28, arranged coaxially adjacent to each other, is unchanged in respect of FIG. 20, and this is likewise the case for the spatial arrangement of all seven shift elements A to G. In this connection, reference is also made to the 10-speed automatic transmission shown in FIG. 12, with which the first planetary gear set RS1 is formed as a positive planetary gear set, while the other three planetary gear sets RS2, RS3 and RS4 are formed as negative planetary gear sets. It is readily apparent that the 11-speed automatic transmission shown in FIG. 28 differs from the exemplary transmission in accordance with FIG. 16 only by the additional seventh shift element G, which—as shown in FIG. 20—is arranged in the power flow between the first shaft 1 (drive shaft AN) and the eighth shaft 8 of the automatic transmission. Thus, a further detailed explanation of FIG. 28 is not necessary.

In knowledge of these two exemplary alternatives, described as examples, to the transmission diagram shown in FIG. 20, the specialist will easily generate alternatives with several positive planetary gear sets other than those listed in the table of FIG. 24. Thereby, in order to maintain the kinematics of the gear set system, only the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

Figure 29:
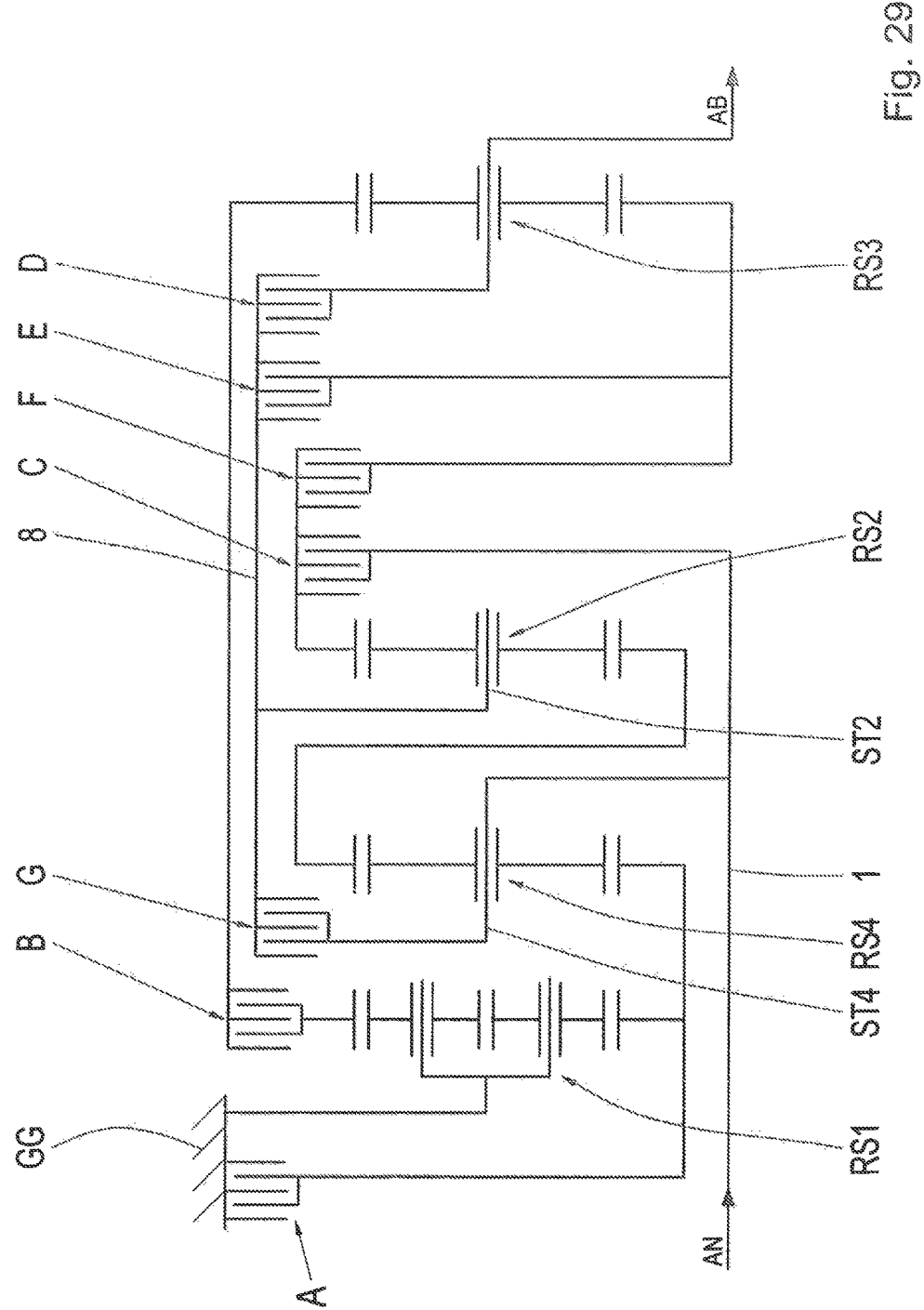
FIG. 29 provides a schematic presentation of a first exemplary alternative to the exemplary transmission in accordance with FIG. 21.

FIG. 29 shows a schematic presentation of a first exemplary alternative to the exemplary transmission diagram shown in FIG. 21. In contrast to the exemplary transmission diagram in accordance with FIG. 21, with which all four planetary gear sets are designed as negative planetary gear sets, in the exemplary transmission diagram in accordance with FIG. 29, the first planetary gear set RS1 is designed as a positive planetary gear set, while the other three planetary gear sets RS2, RS3 and RS4 are designed as planetary gear sets, without any change. Viewed spatially, the sequence of the four individual planetary gear sets in FIG. 29, arranged coaxially adjacent to each other, is unchanged in respect of FIG. 21, and this is likewise the case for the spatial arrangement of all seven shift elements A to G. In this connection, reference is also made to the 10-speed automatic transmission shown in FIG. 13, with which the first planetary gear set RS1 is formed as a positive planetary gear set, while the other three planetary gear sets RS2, RS3 and RS4 are formed as negative planetary gear sets. It is readily apparent that the 11-speed automatic transmission shown in FIG. 29 differs from the exemplary transmission in accordance with FIG. 13 only by the additional seventh shift element G, which—as shown in FIG. 21—is arranged in the power flow between the first shaft 1 (drive shaft AN) and the eighth shaft 8 of the automatic transmission. Thus, a further detailed explanation of FIG. 29 is not necessary.

FIG. 30 shows a schematic presentation of a second exemplary alternative to the exemplary transmission diagram shown in FIG. 21. In contrast to the exemplary transmission diagram in accordance with FIG. 21, with which all four planetary gear sets are designed as negative planetary gear sets, in the exemplary transmission diagram in accordance with FIG. 30, the second planetary gear set RS2 is designed as a positive planetary gear set, while the other three planetary gear sets RS1, RS3, RS4 are designed as planetary gear sets, without any change. Viewed spatially, the sequence of the four individual planetary gear sets in FIG. 30, arranged coaxially adjacent to each other, is unchanged in respect of FIG. 21, and this is likewise the case for the spatial arrangement of all seven shift elements A to G. In this connection, reference is also made to the 10-speed automatic transmission shown in FIG. 15, with which the first planetary gear set RS1 is formed as a positive planetary gear set, while the other three planetary gear sets RS2, RS3 and RS4 are formed as negative planetary gear sets. It is readily apparent that the 11-speed automatic transmission shown in FIG. 30 differs from the exemplary transmission in accordance with FIG. 15 only by the additional seventh shift element G, which—as shown in FIG. 21—is arranged in the power flow between the first shaft 1 (drive shaft AN) and the eighth shaft 8 of the automatic transmission. Thus, a further detailed explanation of FIG. 30 is not necessary.

In knowledge of these two exemplary alternatives, described as examples, to the transmission diagram shown in FIG. 21, the specialist will easily generate alternatives with several positive planetary gear sets other than those listed in the table of FIG. 24. Thereby, in order to maintain the kinematics of the gear set system, only the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

Figure 31:
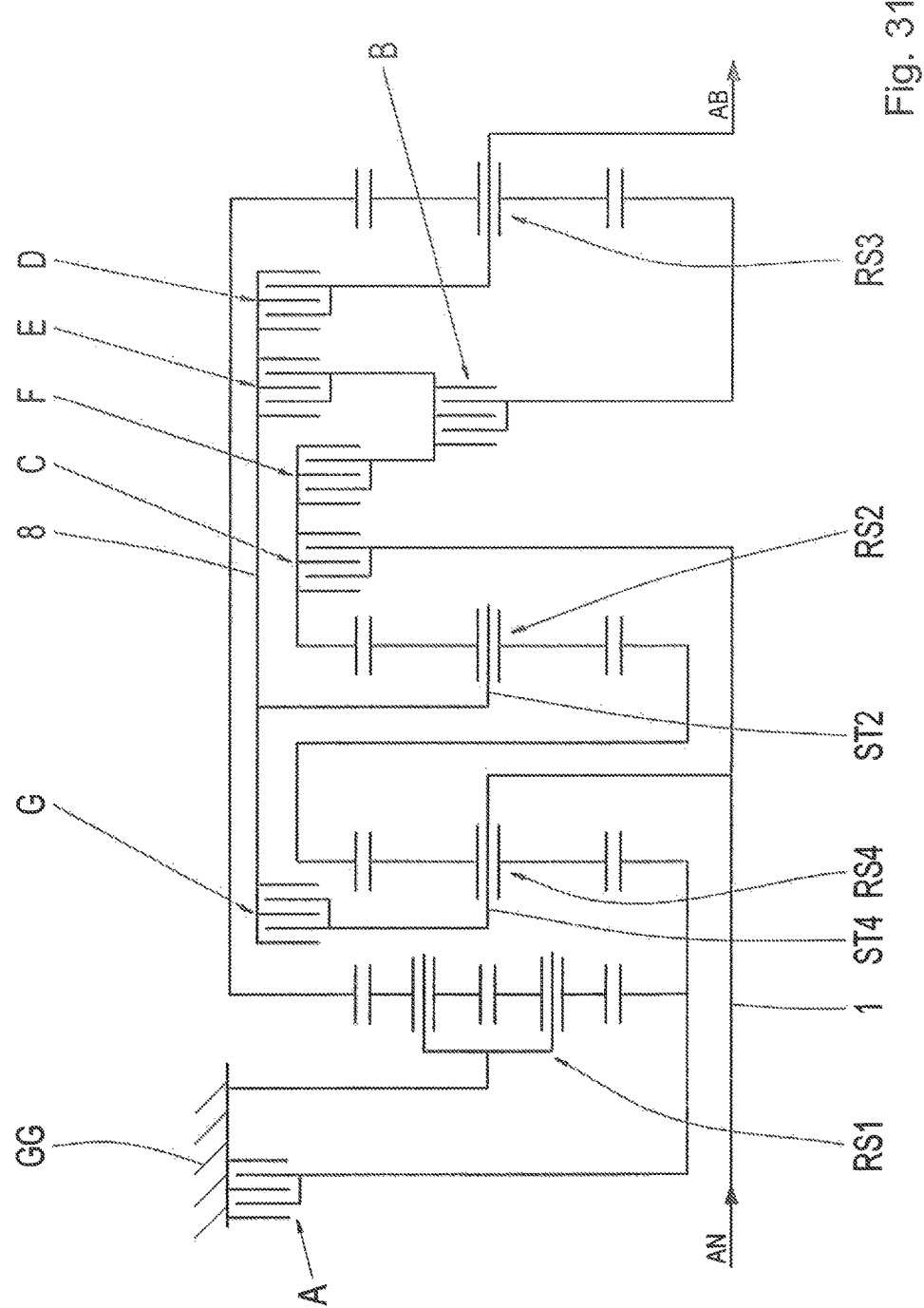
FIG. 31 provides a schematic presentation of a first exemplary alternative to the exemplary transmission in accordance with FIG. 22.

FIG. 31 shows a schematic presentation of a first exemplary alternative to the exemplary transmission diagram shown in FIG. 22. In contrast to the exemplary transmission diagram in accordance with FIG. 22, with which all four planetary gear sets are designed as negative planetary gear sets, in the exemplary transmission diagram in accordance with FIG. 31, the first planetary gear set RS1 is designed as a positive planetary gear set, while the other three planetary gear sets RS2, RS3 and RS4 are designed as planetary gear sets, without any change. Viewed spatially, the sequence of the four individual planetary gear sets in FIG. 31, arranged coaxially adjacent to each other, is unchanged in respect of FIG. 22, and this is likewise the case for the spatial arrangement of all seven shift elements A to G. In this connection, reference is also made to the 10-speed automatic transmission shown in FIG. 16, with which the first planetary gear set RS1 is formed as a positive planetary gear set, while the other three planetary gear sets RS2, RS3 and RS4 are formed as negative planetary gear sets. It is readily apparent that the 11-speed automatic transmission shown in FIG. 31 differs from the exemplary transmission in accordance with FIG. 16 only by the additional seventh shift element G, which—as shown in FIG. 22—is arranged in the power flow between the first shaft 1 (drive shaft AN) and the eighth shaft 8 of the automatic transmission. Thus, a further detailed explanation of FIG. 32 is not necessary.

FIG. 32 shows a schematic presentation of a second exemplary alternative to the exemplary transmission diagram shown in FIG. 22. In contrast to the exemplary transmission diagram in accordance with FIG. 22, with which all four planetary gear sets are designed as negative planetary gear sets, in the exemplary transmission diagram in accordance with FIG. 32, the second planetary gear set RS2 is designed as a positive planetary gear set, while the other three planetary gear sets RS1, RS3, RS4 are designed as planetary gear sets, without any change. Viewed spatially, the sequence of the four individual planetary gear sets in FIG. 32, arranged coaxially adjacent to each other, is unchanged in respect of FIG. 22, and this is likewise the case for the spatial arrangement of all seven shift elements A to G. In this connection, reference is also made to the 10-speed automatic transmission shown in FIG. 18, with which the first planetary gear set RS1 is formed as a positive planetary gear set, while the other three planetary gear sets RS2, RS3 and RS4 are formed as negative planetary gear sets. It is readily apparent that the 11-speed automatic transmission shown in FIG. 32 differs from the exemplary transmission in accordance with FIG. 18 only by the additional seventh shift element G, which—as shown in FIG. 22—is arranged in the power flow between the first shaft 1 (drive shaft AN) and the eighth shaft 8 of the automatic transmission. Thus, a further detailed explanation of FIG. 32 is not necessary.

In knowledge of these two exemplary alternatives, described as examples, to the transmission diagram shown in FIG. 22, the specialist will easily generate alternatives with several positive planetary gear sets other than those listed in the table of FIG. 24. Thereby, in order to maintain the kinematics of the gear set system, only the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

REFERENCE SIGNS

1 First shaft
2 Second shaft
3 Third shaft
4 Fourth shaft
5 Fifth shaft
6 Sixth shaft
7 Seventh shaft
8 Eighth shaft
9 Ninth shaft
A First shift element, first brake
B Second shift element, second brake
C Third shift element, first clutch
D Fourth shift element, second clutch
E Fifth shift element, third clutch
F Sixth shift element, fourth clutch
G Seventh shift element, fifth clutch
AN Drive shaft
AB Output shaft
GG Housing
RS1 First planetary gear set
SO1 Sun gear of the first planetary gear set
ST1 Planetary gear carrier of the first planetary gear set
PL1 Planetary gears of the first planetary gear set
HO1 Ring gear of the first planetary gear set
RS2 Second planetary gear set
SO2 Sun gear of the second planetary gear set
ST2 Planetary gear carrier of the second planetary gear set
PL2 Planetary gears of the second planetary gear set
HO2 Ring gear of the second planetary gear set
RS3 Third planetary gear set
SO3 Sun gear of the third planetary gear set
ST3 Planetary gear carrier of the third planetary gear set
PL3 Planetary gears of the third planetary gear set
HO3 Ring gear of the third planetary gear set
RS4 Fourth planetary gear set
SO4 Sun gear of the fourth planetary gear set
ST4 Planetary gear carrier of the fourth planetary gear set
PL4 Planetary gears of the fourth planetary gear set
HO4 Ring gear of the fourth planetary gear set

The invention claimed is:

1. An automatic transmission, comprising:
a housing;
a plurality of rotatable shafts including a drive shaft, an output shaft, a third shaft, a fourth shaft, a fifth shaft, a sixth shaft, a seventh shaft, an eight shaft and a ninth shaft;
a plurality of planetary gear sets including a first planetary gear set, a second planetary gear set, a third planetary gear set and a fourth planetary gear set, each planetary gear set of the plurality of planetary gear sets comprising a first element, a second element and a third element; and
a plurality of shift elements each configured for selectively opening and closing in order to adjust a transmission ratio between the drive shaft and the output shaft,
wherein the second element of the fourth planetary gear set forms the drive shaft, the second element of the third planetary gear set forms the output shaft, the first element of the fourth planetary gear set forms the third shaft, the fifth shaft is constantly connected to at least two shift elements of the plurality of shift elements, the third element of the third planetary gear set forms the sixth shaft, the seventh shaft constantly connects the first element of the second planetary gear set to the third element of the fourth planetary gear set, the second element of the second planetary gear set forms the eighth shaft, the third shaft coupleable to the housing with a first shift element of the plurality of shift elements, a second shift element of the plurality of shift elements is constantly and directly connected to the fourth shaft, the second shaft coupleable to the eighth shaft with a fourth shift element of the plurality of shift elements, the third element of the second planetary gear set forms the ninth shaft, the first shaft coupleable to the ninth shaft with a third shift element of the plurality of shift elements, the fifth shaft coupleable to the eighth shaft with a fifth shift element of the plurality of shift elements, and the fifth shaft coupleable to the ninth shaft with a sixth shift element of the plurality of shift elements.

2. The automatic transmission of claim 1, wherein the first element of the first planetary gear set is constantly connected to the third shaft, the third element of the first planetary gear set forms the fourth shaft, the third element of the first planetary gear set coupleable to the housing with the second shift element, the first element of the third planetary gear set is constantly connected to the fifth shaft, and the second element of the first planetary gear set is constantly connected to the sixth shaft.

3. The automatic transmission of claim 1, wherein the third element of the first planetary gear set is constantly connected to the housing, the first element of the first planetary gear set forms the fourth shaft, the first element of the first planetary gear set coupleable to the third shaft with the second shift element, the first element of the third planetary gear set constantly connected to the fifth shaft, and the second element of the first planetary gear set constantly connected to the sixth shaft.

4. The automatic transmission of claim 1, wherein the third element of the first planetary gear set is constantly connected to the housing, the first element of the first planetary gear set is constantly connected to the third shaft, the second element of the first planetary gear set forms the fourth shaft, the second element of the first planetary gear set coupleable to the sixth shaft with the second shift element, and the first element of the third planetary gear set is constantly connected to the fifth shaft.

5. The automatic transmission of claim 1, wherein the third element of the first planetary gear set is constantly connected to the housing, the first element of the first planetary gear set is constantly connected to the third shaft, the first element of the third planetary gear set forms a fourth shaft, the first element of the third planetary gear set coupleable to the fifth shaft with the second shift element, the fifth shaft is not directly connected to any of the first, second or third elements of the planetary gear sets, and the second element of the first planetary gear set is constantly connected to the sixth shaft.

6. The automatic transmission of claim 1, wherein the third and sixth shift elements are arranged directly adjacent to each other within the housing.

7. The automatic transmission of claim 1, wherein the fifth and sixth shift elements are arranged directly adjacent to each other within the housing.

8. The automatic transmission of claim 1, wherein the fourth and fifth shift elements are arranged directly adjacent to each other within the housing.

9. The automatic transmission of claim 1, wherein the first shaft is coupleable to the eighth shaft with a seventh shift element of the plurality of shift elements.

10. The automatic transmission of claim 1, wherein four shift elements of the plurality of shift elements are engaged in any gear of the automatic transmission, and, during a change from one gear to a subsequent higher or lower gear, only one previously engaged shift element is opened and only one previously open shift element is closed.

11. The automatic transmission of claim 1, wherein the automatic transmission is shiftable between eleven forward gears and a reverse gear, wherein the first, second, sixth and seventh shift elements are closed in a first forward gear, the first, second, third and sixth shift elements are closed in a second forward gear, the first, second, third and fifth shift elements are closed in a third forward gear, the first, second, fifth and sixth shift elements are closed in a fourth forward gear, the second, third, fifth and sixth shift elements are closed in a fifth forward gear, the second, fourth, fifth and sixth shift elements are closed in a sixth forward gear, the second, third, fourth and fifth shift elements are closed in a seventh forward gear, the second, third, fourth and sixth shift elements are closed in an eighth forward gear, the third, fourth, fifth and sixth shift elements are closed in a ninth forward gear, the first, third, fourth and sixth shift elements are closed in a tenth forward gear, the first, fourth, fifth and sixth shift elements are closed in an eleventh forward gear, and the first, second, fourth and sixth shift elements are closed in the reverse gear.

12. The automatic transmission of claim 1, wherein the automatic transmission is shiftable between ten forward gears and a reverse gear, wherein the first, second, third and sixth shift elements are closed in a first forward gear, the first, second, third and fifth shift elements are closed in a second forward gear, the first, second, fifth and sixth shift elements are closed in a third forward gear, the second, third, fifth and sixth shift elements are closed in a fourth forward gear, the second, fourth, fifth and sixth shift elements are closed in a fifth forward gear, the second, third, fourth and fifth shift elements are closed in a sixth forward gear, the second, third, fourth and sixth shift elements are closed in a seventh forward gear, the third, fourth, fifth and sixth shift elements are closed in an eighth forward gear, the first, third, fourth and sixth shift elements are closed in a ninth forward gear, the first, fourth, fifth and sixth shift elements are closed in a tenth forward gear, and the first, second, fourth and sixth shift elements are closed in the reverse gear.

13. The automatic transmission of claim 1, wherein all of the first, second, third and fourth planetary gear sets are formed as negative planetary gear sets.

14. The automatic transmission of claim 1, wherein one of the first, second, third and fourth planetary gear sets is formed as a positive planetary gear set and the others of the first, second, third and fourth planetary gear sets are formed as negative planetary gear sets.

15. The automatic transmission of claim 14, wherein the first, second or fourth planetary gear set is formed as the positive planetary gear set.

16. The automatic transmission of claim 1, wherein two of the first, second, third and fourth planetary gear sets are formed as positive planetary gear sets and the others of the first, second, third and fourth planetary gear sets are formed as negative planetary gear sets.

17. The automatic transmission of claim 1, wherein the third planetary gear set is formed as a negative planetary gear set and each of the first, second and fourth planetary gear sets is formed as a positive planetary gear set.

18. The automatic transmission of claim 1, wherein the first element of each negative and positive planetary gear set of the plurality of planetary gear sets is a sun gear, the second element of each negative planetary gear set of the plurality of planetary gear sets is a planet carrier, the second element of each positive planetary gear set of the plurality of planetary gear sets is a ring gear, the third element of each negative planetary gear set of the plurality of planetary gear sets is a ring gear, the third element of each positive planetary gear set of the plurality of planetary gear sets is a planet carrier.

19. The automatic transmission of claim 1, wherein the first, second, third and fourth planetary gear sets are arranged coaxially next to one another in order of first planetary gear set, fourth planetary gear set, second planetary gear set and then third planetary gear set along an axial direction within the housing.

20. The automatic transmission of claim 19, wherein the first shift element is disposed opposite the fourth planetary gear set about the first planetary gear set within the housing.

21. The automatic transmission of claim 19, wherein the second shift element is disposed radially adjacent the first planetary gear set within the housing.

22. The automatic transmission of claim 19, wherein the second shift element is disposed opposite the fourth planetary gear set about the first planetary gear set within the housing and is also disposed axially adjacent the first planetary gear set within the housing.

23. The automatic transmission of claim 19, wherein the second shift element is disposed between the first and fourth planetary gear sets along the axial direction within the housing.

24. The automatic transmission of claim 19, wherein the second shift element disposed between the second and third planetary gear sets along the axial direction within the housing and is also disposed axially adjacent the third planetary gear set within the housing.

25. The automatic transmission of claim 19, wherein the second shift element disposed radially adjacent the third planetary gear set within the housing.

26. The automatic transmission of claim 19, wherein the second shift element disposed between the second and third planetary gear sets along the axial direction within the housing.

27. The automatic transmission of claim 26, wherein the second shift element is radially inward of at least one of the fifth shift element or the sixth shift element within the housing.

28. The automatic transmission of claim 26, wherein the second shift element is disposed adjacent the third planetary gear set within the housing.

29. The automatic transmission of claim 19, wherein the second shift element is formed a positive-locking shift element.

30. The automatic transmission of claim 29, wherein the positive-locking second shift element is disposed at least partially within the first element of the first planetary gear set within the housing.

31. The automatic transmission of claim 29, wherein the positive-locking second shift element is disposed at least partially within the third element of the third planetary gear set.

32. The automatic transmission of claim 19, wherein the third shift element is disposed between the second and third planetary gear sets along the axial direction within the housing and is also disposed adjacent the second planetary gear set within the housing.

33. The automatic transmission of claim 19, wherein the fourth shift element is disposed between the second and third planetary gear sets along the axial direction within the housing and is also disposed adjacent the third planetary gear set within the housing.

34. The automatic transmission of claim 19, wherein the fourth shift element is disposed between the second and fourth planetary gear sets along the axial direction within the housing and is also disposed adjacent the second planetary gear set within the housing.

35. The automatic transmission of claim 19, wherein the fifth shift element is disposed between the second and fourth planetary gear sets along the axial direction within the housing.

36. The automatic transmission of claim 19, wherein the sixth shift element is disposed between the second and fourth planetary gear sets along the axial direction within the housing.

37. The automatic transmission of claim 19, wherein the seventh shift element is disposed between the first and fourth planetary gear sets along the axial direction within the housing.

38. The automatic transmission of claim 19, wherein the seventh shift element is radially outward of the fourth planetary gear set within the housing.

39. The automatic transmission of claim 19, wherein the seventh shift element is disposed between the second and fourth planetary gear sets along the axial direction within the housing.

* * * * *